US007273995B1

(12) United States Patent
Manz et al.

(10) Patent No.: US 7,273,995 B1
(45) Date of Patent: Sep. 25, 2007

(54) PLASMA GENERATOR

(75) Inventors: Andreas Manz, Surrey (GB); Jan Cornelis Titus Eijkel, London (GB); Herbert Stoeri, Vienna (AT)

(73) Assignee: Imperial College of Science, Technology and Medicine, London (GB)

( * ) Notice: Subject to any disclaimer, the term of this patent is extended or adjusted under 35 U.S.C. 154(b) by 0 days.

(21) Appl. No.: 10/344,345

(22) PCT Filed: Nov. 23, 1999

(86) PCT No.: PCT/GB99/03892

§ 371 (c)(1), (2), (4) Date: Feb. 11, 2003

(87) PCT Pub. No.: WO00/32017

PCT Pub. Date: Jun. 2, 2000

(30) Foreign Application Priority Data

Nov. 24, 1998 (GB) ................................ 9825722.3

(51) Int. Cl.
*B23K 10/06* (2006.01)

(52) U.S. Cl. .......................... 219/121.43; 219/121.52; 219/121.48; 355/111.21; 422/80

(58) Field of Classification Search ........... 219/121.43, 219/121.4, 121.41, 121.52, 121.48; 315/111.51, 315/111.21, 39; 118/723 R, 723 D; 264/614; 435/6; 204/400–403; 422/82.07, 82.08, 422/810, 80
See application file for complete search history.

(56) References Cited

U.S. PATENT DOCUMENTS 4,282,418 A * 8/1981 Wuestner ................. 219/121.5
4,853,590 A * 8/1989 Andreadakis ............... 313/485
5,401,963 A * 3/1995 Sittler ........................ 250/288
5,626,772 A * 5/1997 Bongaerts et al. ............ 216/24
5,705,813 A * 1/1998 Apffel et al. ............... 250/288
5,716,825 A * 2/1998 Hancock et al. ......... 435/286.5
6,006,763 A * 12/1999 Mori et al. .................. 134/1.1
6,801,001 B2 * 10/2004 Drobot et al. ........... 315/169.3
2005/0063865 A1 * 3/2005 Bonne et al. .............. 422/68.1

OTHER PUBLICATIONS

International Search Report dated Mar. 9, 2000.
British Search Report dated Mar. 1, 2000.
Microfabricated High Intensity Discharge Lamps, Khan et al., XP-002131584, vol. 15, No. 3, 43rd National Symposium of the American Vacuum Society, Oct. 14-18, 1996, Journal of Vacuum Science & Technology A, May-Jun. 1997, pp. 1220-1222.
High Pressure Discharges in Cavities Formed by Microfabrication Techniques, XP-002131585, Applied Physics Letters, Jul. 14, 1997, vol. 71, No. 2, pp. 163-165.
Surface Microstructure/Miniature Mass Spectrometer: Processing and Applications, XP-000878983, Siebert et al., Applied Physics A (Materials Science Processing), Aug. 1998, vol. A67, No. 2 pp. 155-160.
Khan, B.A. et al: "High pressure discharges in cavities formed by microfabrication techniques" Applied Physics Letters, Jun. 14, 1997, AIP, USA, vol. 71, No. 2, pp. 163-165, XP002131584.

(Continued)

*Primary Examiner*—Mark Paschall
(74) *Attorney, Agent, or Firm*—Nixon & Vanderhye P.C.

(57) ABSTRACT

A microfabricated plasma generator and a method of generating a plasma, the plasma generator comprising: a substrate chip; a chamber defined by the substrate chip, the chamber including an inlet port through which analyte is in use delivered, an outlet port and a plasma-generation region in which a plasma is in use generated; and first and second electrodes across which a voltage is in use applied to generate a plasma in the plasma-generation region.

64 Claims, 16 Drawing Sheets

OTHER PUBLICATIONS

Siebert, P. et al: "Surface microstructure/minature mass spectrometer: processing and applications" Applied Physics A (Materials Science Processing), Aug. 1998, Springer-Verlag, Germany, vol. A67, No. 2, pp. 155-160, XP000878983.

Khan, B.A. et al: "Microfabricated high intensity discharge 1 amps" 43rd National Symposium of the American Vacuum Society, Philadelphia, PA, USA, Oct. 14-18, 1996, vol. 15, No. 3, pt. 2, pp. 1220-1222, XP00213585.

* cited by examiner

PLASMA GENERATOR

This application is the U.S. national phase of international application PCT/GB99/03892 filed in 23 Nov. 1999, which designated the U.S. PCT/GB99/03892 claims priority of GB Application No. 9825722.3, filed 24 Nov. 1998. The entire contents of these applications are incorporated herein by reference.

The present invention relates to a microfabricated chip-based plasma generator, in particular when acting as a sensor, and to a measurement system incorporating the same.

Recently, microfabricated chip-based separation systems, in particular gas chromatography, liquid chromatography and capillary electroseparation systems, have been developed.

It is an aim of the present invention to provide a microfabricated chip-based plasma generator which could be integrated with the recently developed chip-based separation systems. The combination of such a plasma generator acting as a sensor and separation system would provide a very powerful instrument offering particular benefits from downscaling. These benefits include portability, low power consumption, a significant reduction in reagent consumption, improved analytical performance in particularly providing shorter analysis times, higher throughput and reproducible handling of fluid volumes in the picolitre range, and the possibility of parallel processing and mass production.

Accordingly, the present invention provides a microfabricated plasma generator, comprising: a substrate chip; a chamber defined by the substrate chip, the chamber including an inlet port through which analyte is in use delivered, an outlet port and a plasma generation region in which a plasma is in use generated; and first and second electrodes across which a voltage is in use applied to generate a plasma therebetween in the plasma-generation region.

In one embodiment the plasma generator is a gas discharge plasma generator.

In another embodiment the plasma generator is a flame plasma generator.

The generation of the plasma by gas discharge is preferred to the use of a flame as the operating parameters can be more easily controlled.

Preferably, the inlet port is located between the first and second electrodes.

In one embodiment the outlet port is located at one of the first and second electrodes.

Preferably, the chamber includes first and second outlet ports, each located at a respective one of the first and second electrodes.

In another embodiment the outlet port is located between the first and second electrodes.

Preferably, the outlet port is located between the inlet port and one of the first and second electrodes.

More preferably, the chamber includes first and second outlet ports, each located between the inlet port and a respective one of the first and second electrodes.

Preferably, the chamber includes a further inlet port through which reactant is in use delivered.

Preferably, the further inlet port is located between the first and second electrodes.

More preferably, an outlet port is located between the further inlet port and one of the first and second electrodes.

Preferably, the chamber includes a second further inlet port through which operating medium is in use delivered.

More preferably, the chamber includes second and third further inlet ports through which operating medium is in use delivered.

Still more preferably, the second and third further inlet ports are located at respective ones of the first and second electrodes.

Preferably, the plasma-generation region comprises an elongate region.

More preferably, the plasma-generation region comprises an elongate linear region.

In one embodiment the first and second electrodes are disposed on the longitudinal axis of the plasma-generation region.

In another embodiment the first and second electrodes are offset from the longitudinal axis of the plasma-generation region.

Preferably, the first and second electrodes are disposed so as to oppose one another.

More preferably, the first and second electrodes comprise substantially planar elements disposed substantially parallel to one another.

In one embodiment the first and second electrodes comprise solid electrodes.

Preferably, at least one of the first and second electrodes is a hollow electrode.

In another embodiment at least one of the first and second electrodes comprises a liquid electrode.

Preferably, the first and second electrodes comprise liquid electrodes.

Preferably, the plasma generator further comprises at least one focussing lens in optical communication with the plasma-generation region.

Preferably, the at least one lens is defined by the substrate chip.

Preferably, the plasma generator further comprises a reflective surface adjacent the plasma-generation region for reflecting light emitted in use by the plasma towards a detection location.

In one embodiment the detection location is within the plasma-generation region.

Preferably, the plasma generator further comprises at least one optical detector in optical communication with the plasma-generation region.

In one embodiment the at least one optical detector comprises a photodiode.

Preferably, the plasma generator comprises a plurality of optical detectors in optical communication with the plasma-generation region.

Preferably, each optical detector is sensitive to light of a predetermined wavelength or range of wavelengths.

Preferably, the plasma generator further comprises an optical guide in optical communication with the plasma-generation region for providing a means of optical coupling to an optical detector.

Preferably, the plasma generator further comprises at least one supplementary electrode disposed such as to be in electrical connection with a location in the plasma-generation region spaced from the first and second electrodes.

More preferably, the plasma generator comprises a plurality of supplementary electrodes disposed such as to be in electrical connection with spaced locations in the plasma-generation region.

Preferably, the plasma-generation region is enclosed by the substrate chip.

Preferably, the volume of the plasma-generation region is not more than 1 ml.

More preferably, the volume of the plasma-generation region is not more than 100 μl.

Still more preferably, the volume of the plasma-generation region is not more than 10 μl.

Yet more preferably, the volume of the plasma-generation region is not more than 450 nl.

Yet still more preferably, the volume of the plasma-generation region is not more than 50 nl.

In one embodiment the chamber is shaped and/or dimensioned such as to operate at sub-atmospheric pressures.

In another embodiment the chamber is shaped and/or dimensioned such as to operate at or above atmospheric pressure.

Preferably, the plasma generator comprises a plurality of chambers and a plurality of first and second electrodes for generating a plasma in each of the chambers, with the outlet ports of each of the chambers being coupled together such that the chambers are arranged in parallel.

Preferably, the substrate chip comprises a plurality of planar substrates as a multi-layered structure.

In one embodiment one of the planar substrates includes a cavity defining the chamber.

In another embodiment a plurality of the planar substrates each include a cavity defining the chamber.

In a preferred embodiment the plasma generator acts as a sensor.

The present invention also extends to a measurement system incorporating the above-described plasma generator.

The present invention also provides a method of generating a plasma, comprising the steps of: providing a plasma generator comprising a substrate chip defining a chamber including a plasma-generation region, and first and second electrodes across which a voltage is applied to generate a plasma in the plasma-generation region; delivering analyte and operating medium to the chamber; and applying a voltage across the first and second electrodes to generate a plasma therebetween in the plasma-generation region.

In one embodiment the first and second electrodes comprise solid electrodes.

In another embodiment at least one of the first and second electrodes comprises a liquid electrode.

Preferably, the first and second electrodes comprise liquid electrodes.

In one embodiment the analyte is a gas or vapour.

In another embodiment the analyte is delivered as a liquid which evaporates on introduction into the chamber.

In one embodiment the operating medium is a gas or vapour.

In another embodiment the operating medium is delivered as a liquid which evaporates on introduction into the chamber.

In a further embodiment the analyte and the operating medium are delivered together as a liquid which evaporates on introduction into the chamber.

In a still further embodiment the operating medium is delivered as a liquid which provides the cathode and evaporates into the plasma-generation region.

In a yet further embodiment the analyte and the operating medium are delivered together as a liquid which provides the cathode and evaporates into the plasma-generation region.

Preferably, the anode is provided by the liquid when condensed.

In one embodiment the plasma generator is a gas discharge plasma generator.

In another embodiment the plasma generator is a flame plasma generator and the operating medium is a fuel which is ignited on the application of a voltage across the first and second electrodes.

Preferably, the operating medium comprises first and second fuel components.

Materials suitable for use as the substrate chip include diamond, glass, quartz, sapphire, silicon, polymers and ceramics.

Preferred embodiments of the present invention will now be described hereinbelow by way of example only with reference to the accompanying drawings, in which:

FIG. 1 schematically illustrates a plan view of the chip layout of a microfabricated chip-based plasma generator in accordance with a first embodiment of the present invention;

FIG. 2 schematically illustrates an elevational view of a first modified chip layout of the plasma generator of FIG. 1;

FIG. 3 schematically illustrates an elevational view of a second modified chip layout of the plasma generator of FIG. 1;

FIG. 4 schematically illustrates a measurement system incorporating the plasma generator of FIG. 1;

FIG. 5 illustrates the measurement circuit of the measurement system of FIG. 4;

FIG. 6 schematically illustrates an elevational view of a third modified chip layout of the plasma generator of FIG. 1;

Figure 11:
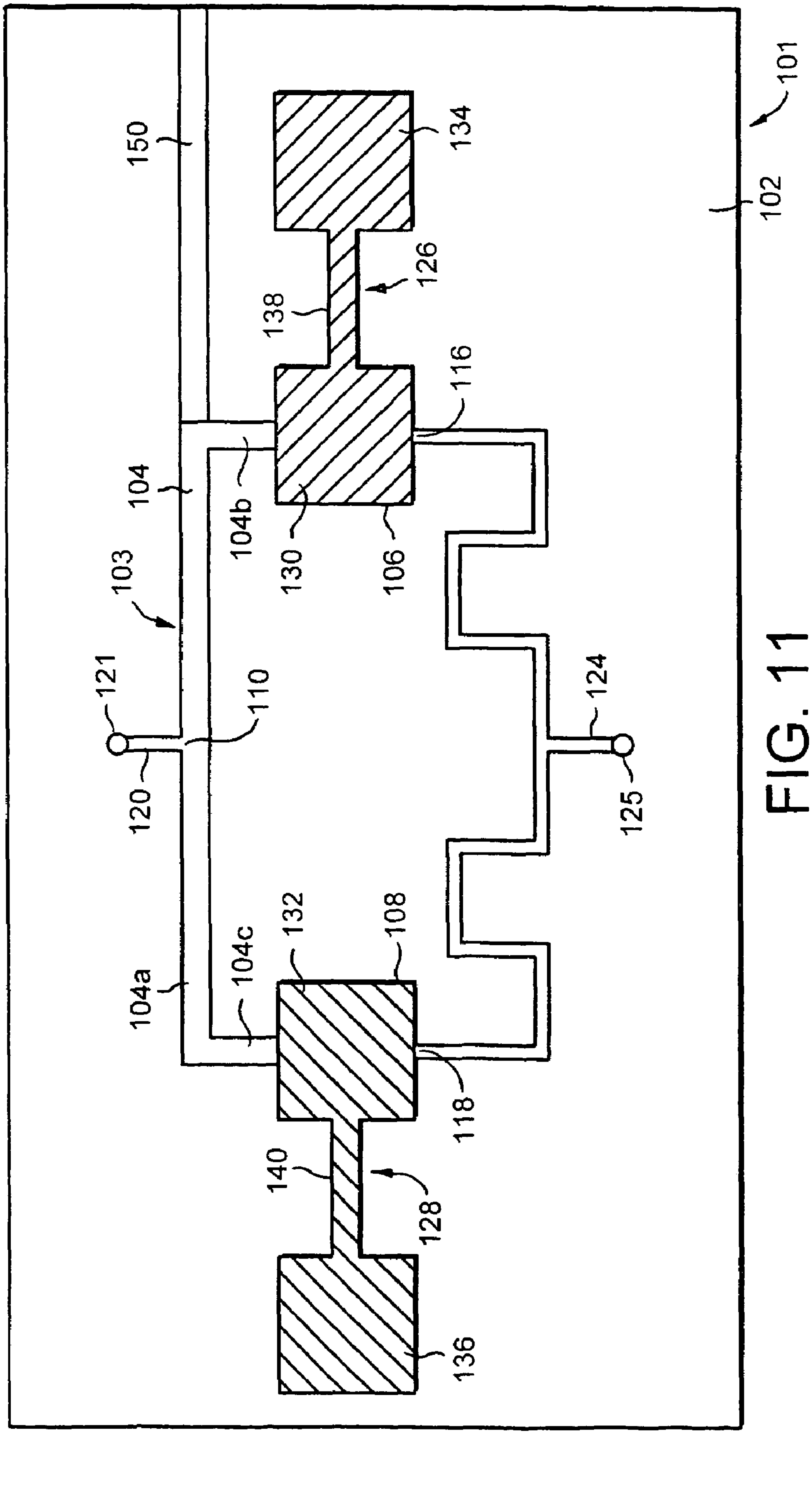
Figure 12:
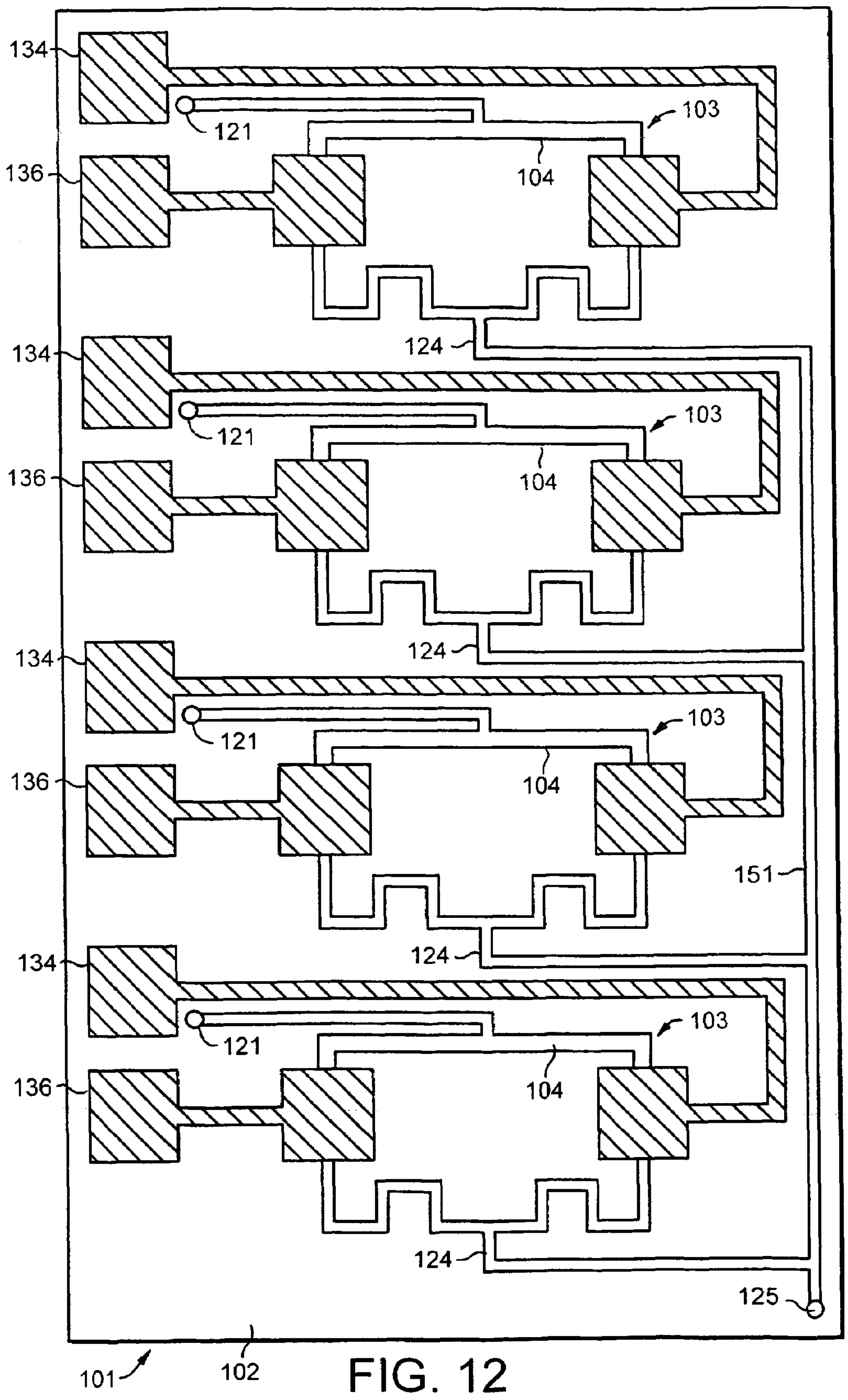
Figure 13:
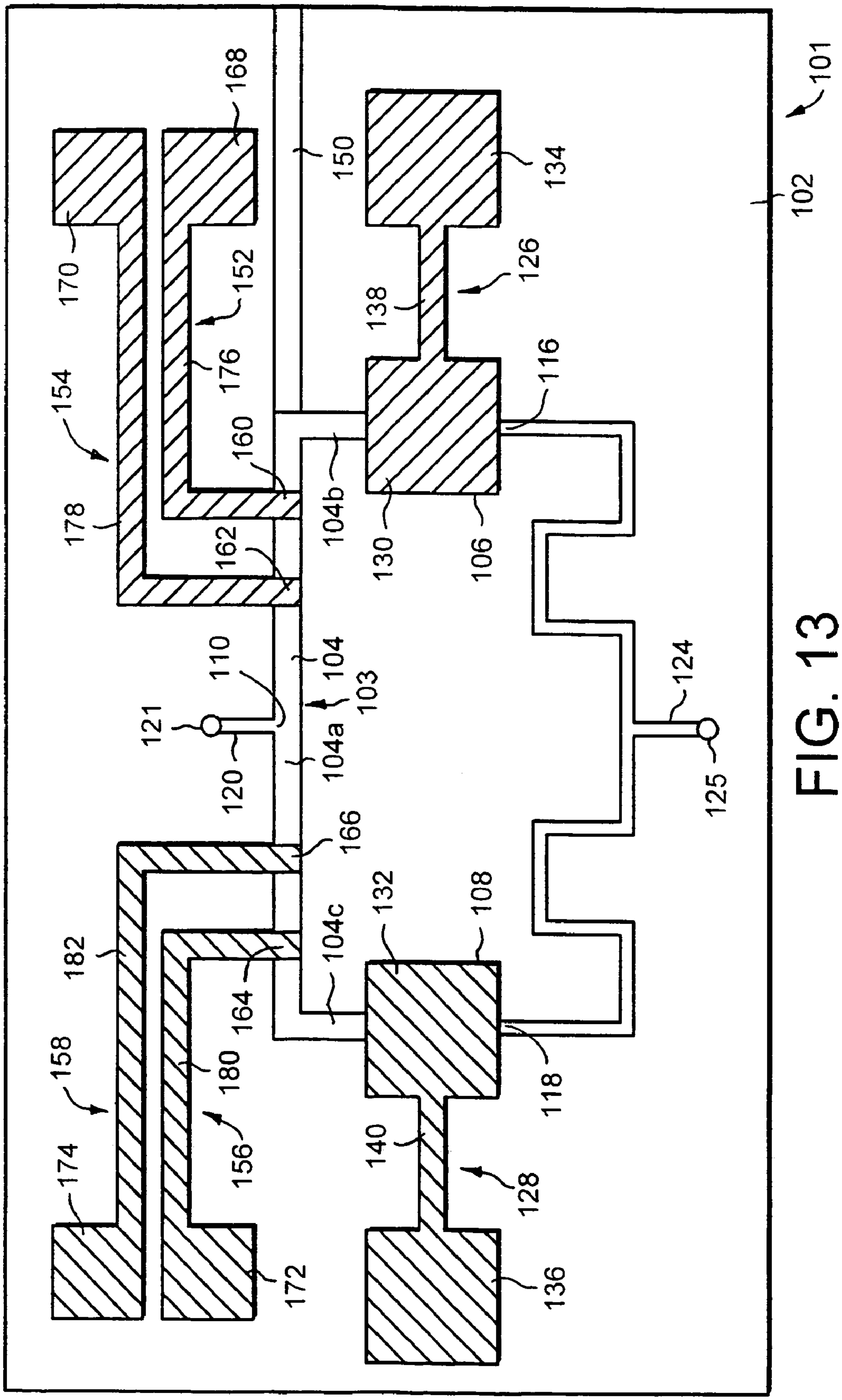
Figure 14:
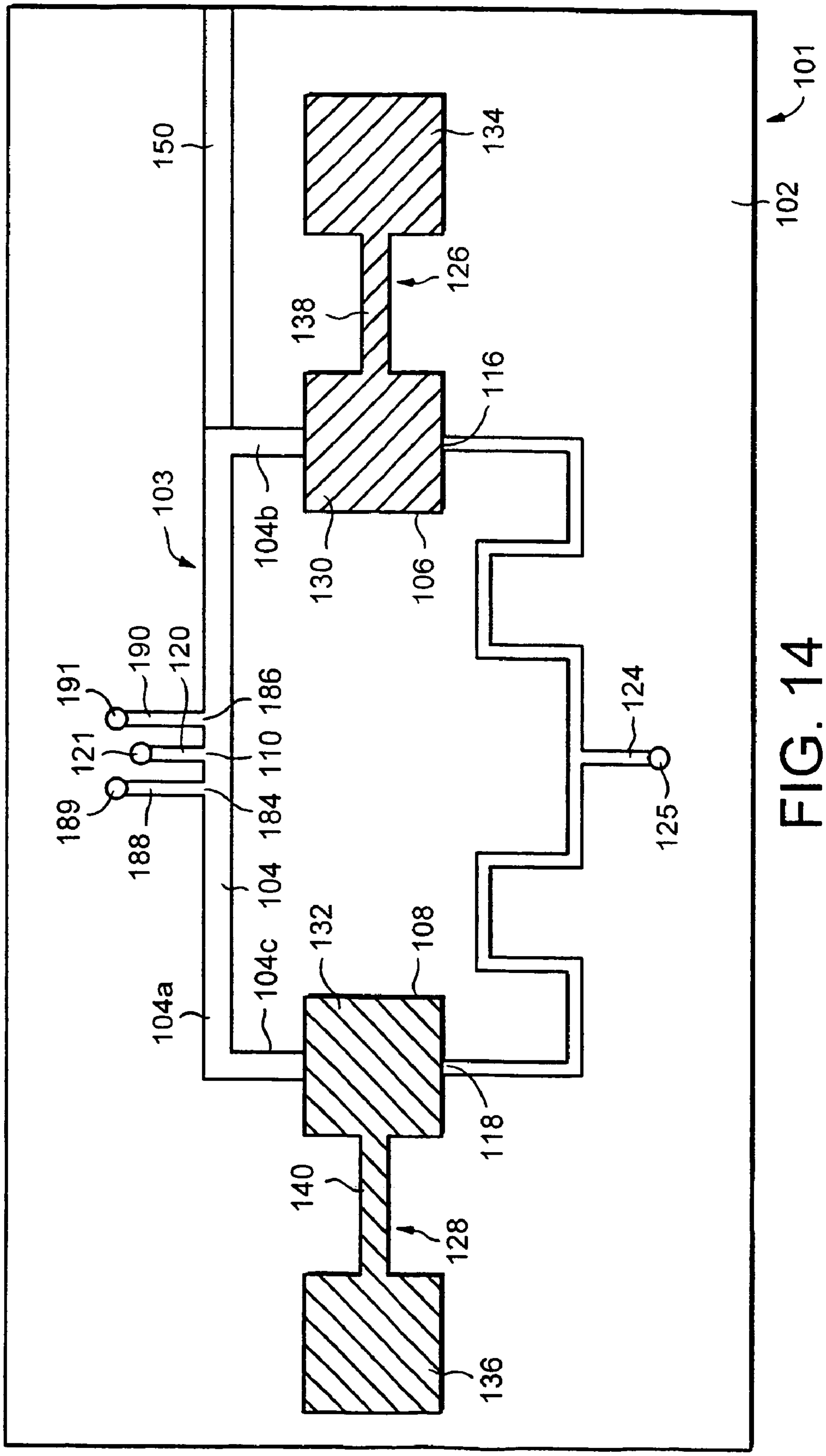
Figure 15:
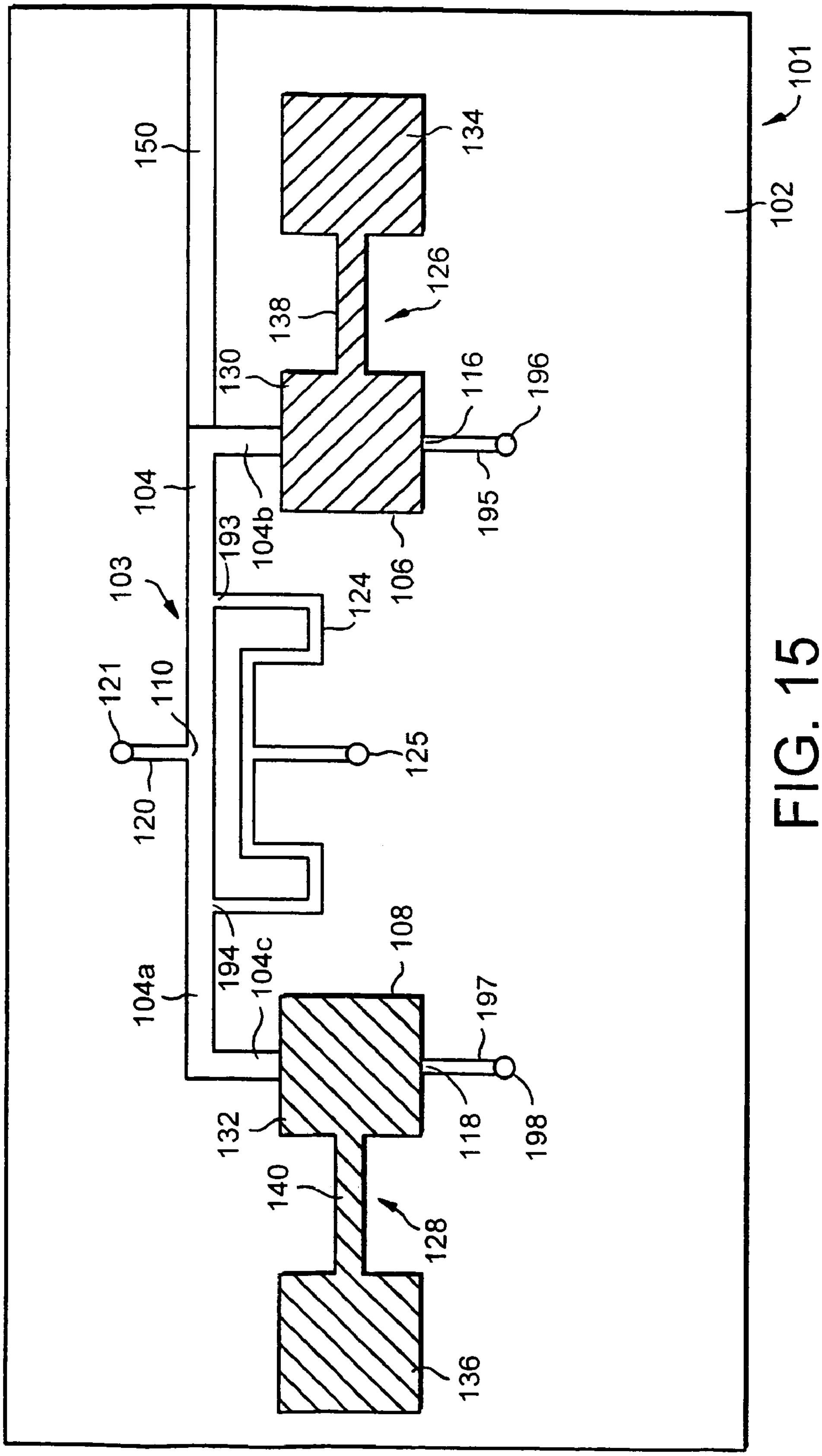
Figure 16:
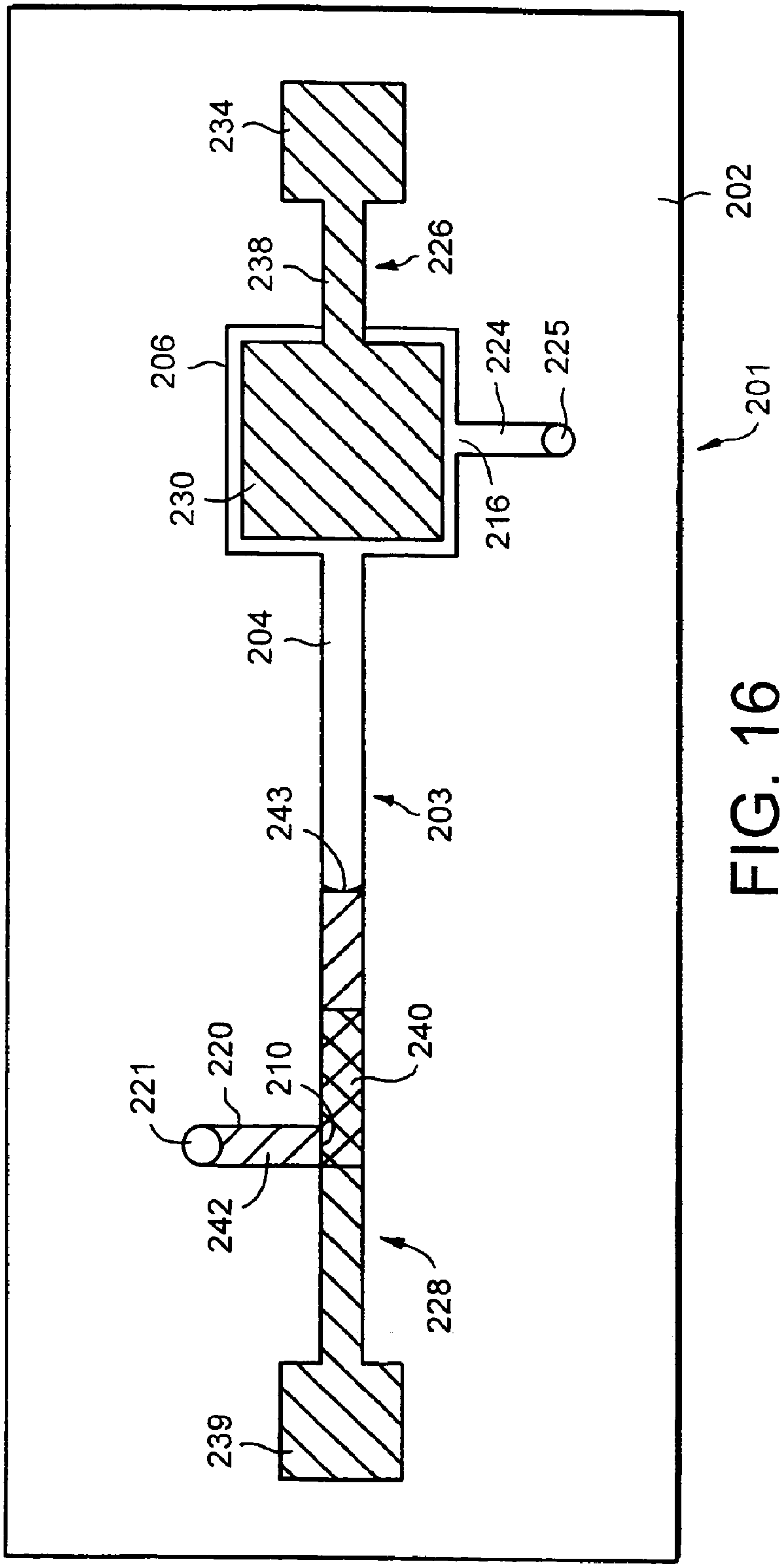
Figure 17:
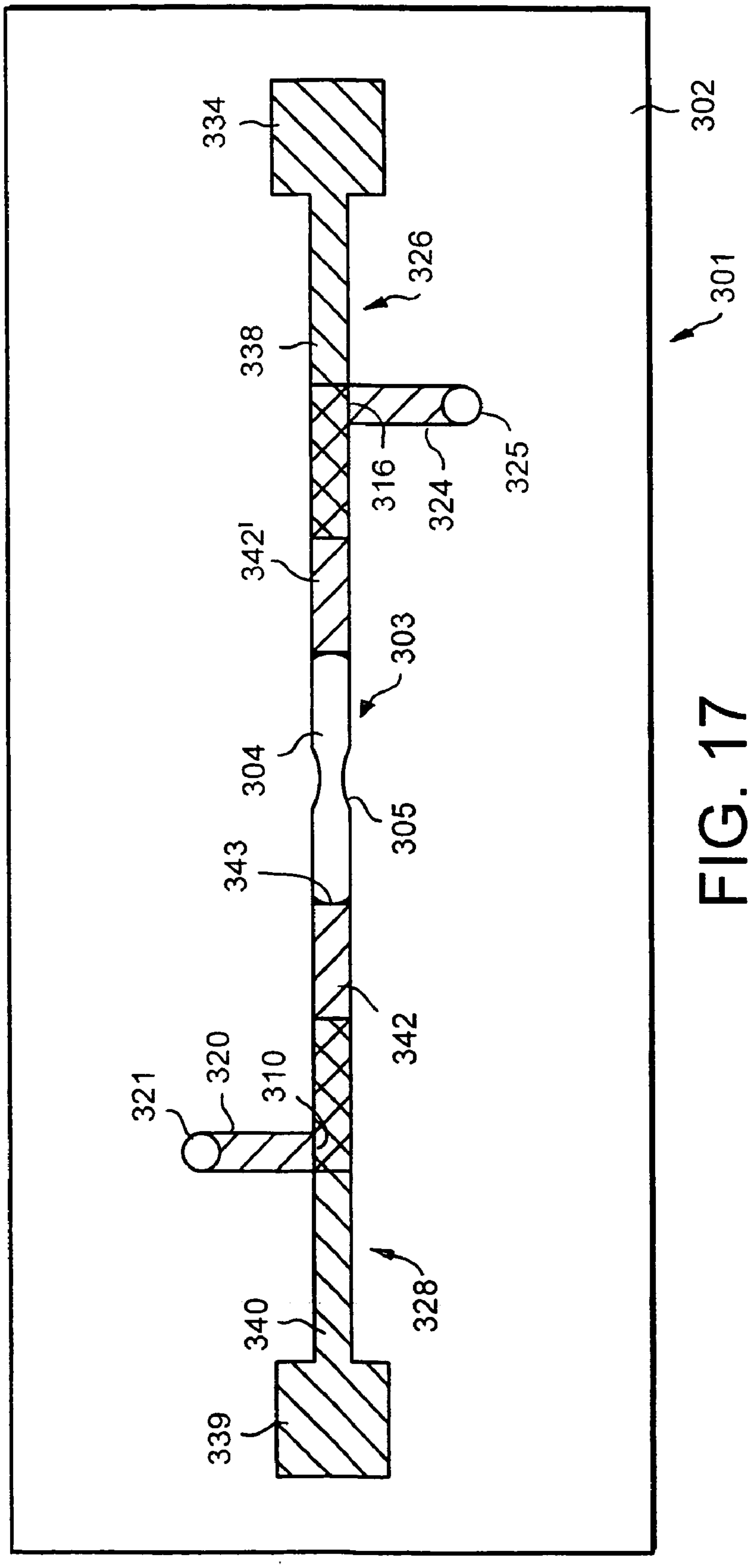
Figure 18:
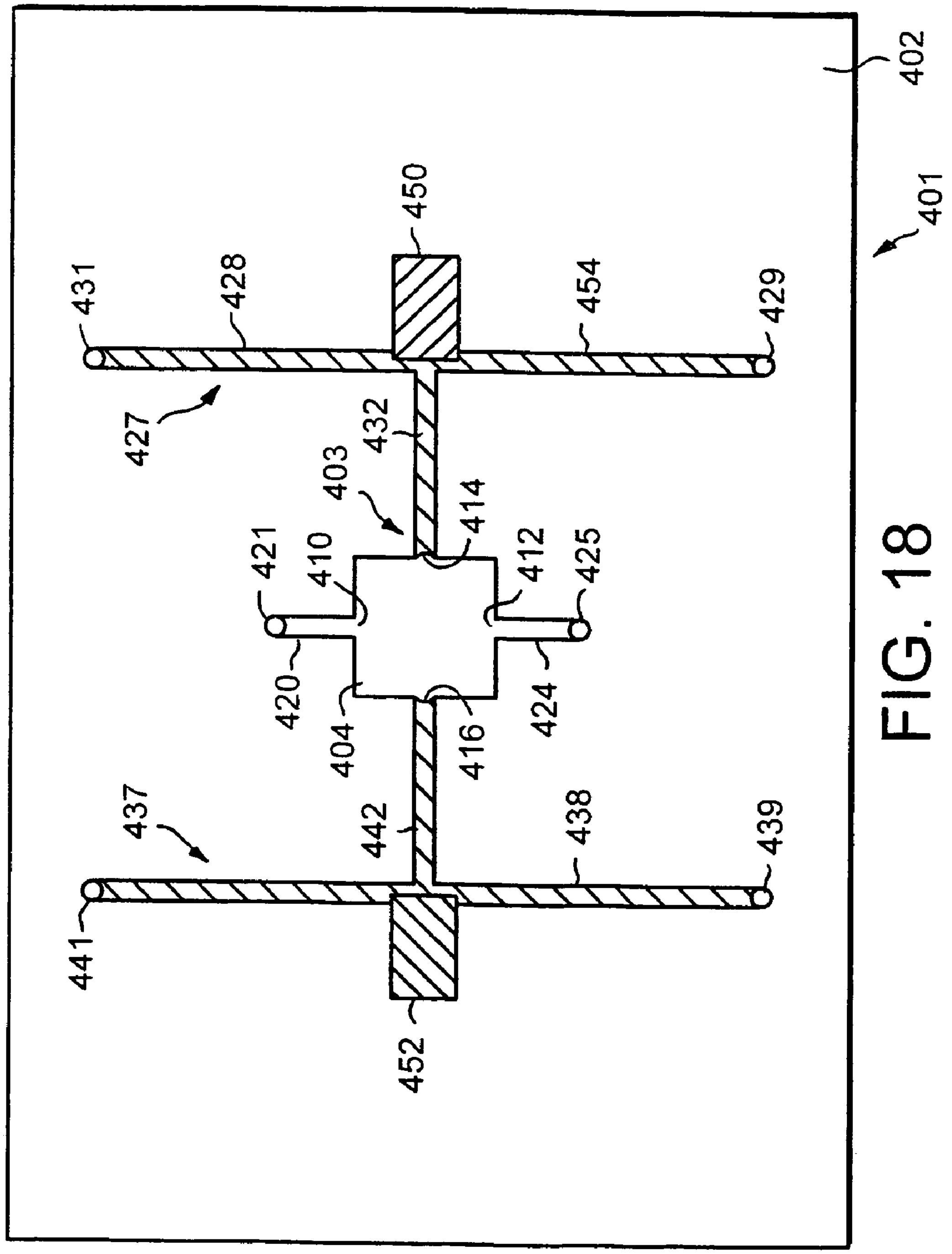

FIG. 11 schematically illustrates a plan view of the chip layout of a microfabricated chip-based plasma generator in accordance with a second embodiment of the present invention;

FIG. 12 schematically illustrates a plan view of the chip layout of a microfabricated chip-based plasma generator in accordance with a third embodiment of the present invention;

FIG. 13 schematically illustrates a plan view of the chip layout of a microfabricated chip-based plasma generator in accordance with a fourth embodiment of the present invention;

FIG. 14 schematically illustrates a plan view of the chip layout of a microfabricated chip-based plasma generator in accordance with a fifth embodiment of the present invention;

FIG. 15 schematically illustrates a plan view of the chip layout of a microfabricated chip-based plasma generator in accordance with a sixth embodiment of the present invention;

FIG. 16 schematically illustrates a plan view of the chip layout of a microfabricated chip-based plasma generator in accordance with a seventh embodiment of the present invention;

FIG. 17 schematically illustrates a plan view of the chip layout of a microfabricated chip-based plasma generator in accordance with an eighth embodiment of the present invention; and FIG. 18 schematically illustrates a plan view of the chip layout of a microfabricated chip-based plasma generator in accordance with a ninth embodiment of the present invention.

Figure 1:
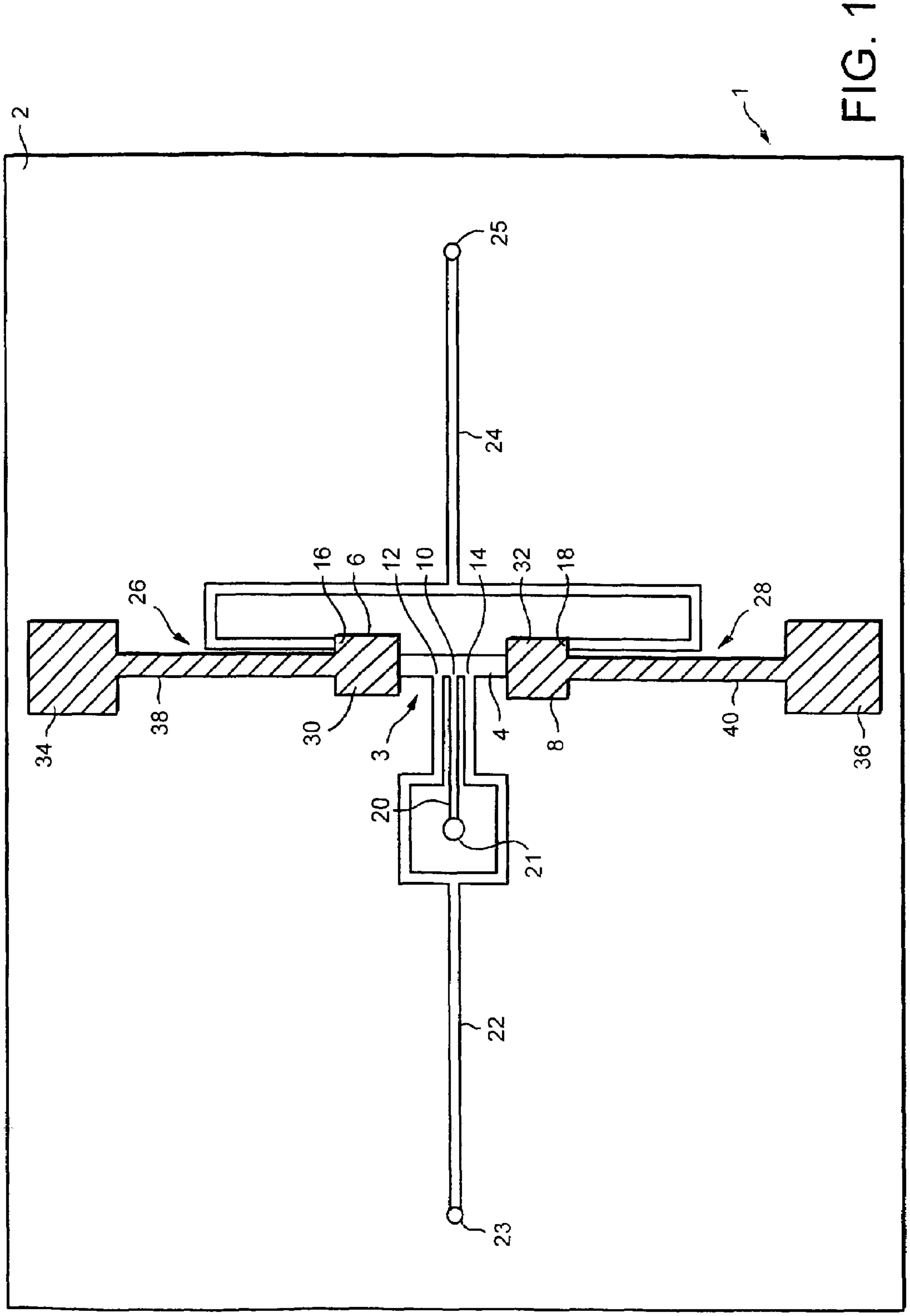

FIG. 1 illustrates a microfabricated plasma generator 1 in accordance with a first embodiment of the present invention as fabricated in a substrate chip 2.

The chip 2 includes a chamber 3 which defines a plasma-generation region 4, in this embodiment an elongate linear region, in which a plasma is in use generated, and first and second electrode-housing regions 6, 8 at respective ends of the plasma-generation region 4.

The chamber 3 includes a first port 10 located at a midpoint along the length of the plasma-generation region 4, second and third ports 12, 14 located adjacent to and on opposed sides of the first port 10, and fourth and fifth ports 16, 18 located at respective ones of the electrode-housing regions 6, 8.

The chip 2 further includes a first channel 20 which includes a port 21 and provides a fluid communication path with the first port 10 of the chamber 3, a second channel 22 which includes a port 23 and provides a fluid communication path with the second and third ports 12, 14 of the chamber 3, and a third channel 24 which includes a port 25 and provides a fluid communication path with the fourth and fifth ports 16, 18 of the chamber 3.

The chip 2 further includes first and second conductive electrode members 26, 28, with each of the electrode members 26, 28 comprising an electrode 30, 32 disposed in a respective one of the electrode-housing regions 6, 8, a contact pad 34, 36 for providing a means of contact to an external power supply, and a lead 38, 40 connecting the electrode 30, 32 and the contact pad 34, 36. Materials suitable for the electrode members 26, 28 include gold and tungsten.

Figure 2:
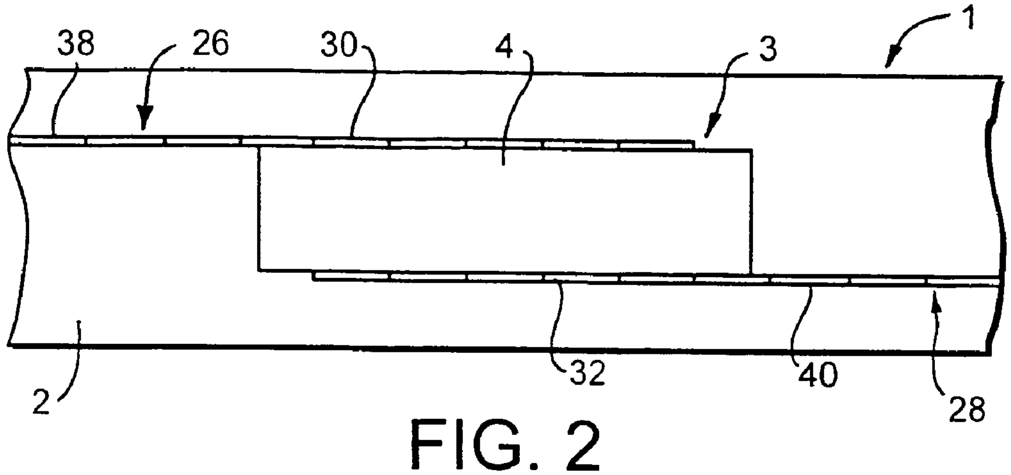

In this embodiment the electrodes 30, 32 are located in electrode-housing regions 6, 8 at opposed ends of a linear plasma-generation region 4. It will be understood, however, that the electrodes 30, 32 can have any configuration which allow a plasma to be generated therebetween. In one modification, as illustrated in FIG. 2, the electrodes 30, 32 can be opposed elongate elements which extend substantially along one dimension of the chamber 3 defining the plasma-generation region 4.

Figure 3:
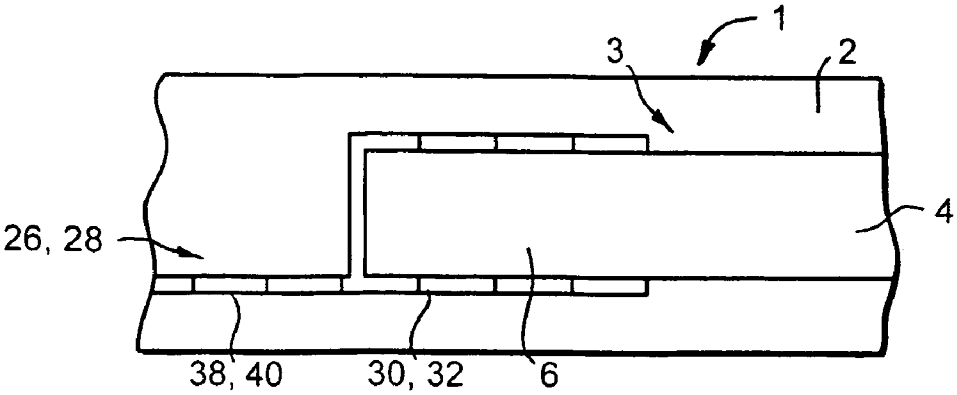

Further, in this embodiment the electrodes 30, 32 are substantially planar elements which extend over one surface of the respective electrode-housing regions 6, 8. In another modification, as illustrated in FIG. 3, the electrodes 30, 32, in particular that electrode which acts as the cathode, can be hollow. In this modified chip 2, the electrodes 30, 32 are each defined by a conductive layer which extends over substantially all of the surfaces of the respective electrode-housing regions 6, 8. In this respect, hollow electrodes 30, 32 could advantageously develop in use as a result of the re-distribution of the electrode material by sputtering from, for example, planar electrode elements.

In this embodiment the plasma generator 1 is configured to be driven by applying a d.c. high voltage, pulsed or continuous, across the electrodes 30, 32. In a preferred embodiment inductive or piezoelectric voltage converters are used as the electrical supply to provide the very small average currents at the relatively high voltages required to drive the plasma generator 1. As will be appreciated, such voltage converters are much more compact than the conventional electrical supply arrangement of a high voltage power supply and high impedance resistors.

In a further preferred embodiment high impedance resistors are included in the electrode members 26, 28 so as to offset the negative differential impedance of the plasma and thereby provide for stable d.c. operation. In a particularly preferred embodiment the high impedance resistors are located as closely as possible to the electrodes 30, 32 so as to minimise the parasitic capacitance and thereby provide enhanced d.c. stability.

The chip 2 is fabricated from two planar substrate plates, in this embodiment composed of microsheet glass. In a first step, one plate is etched by HF wet etching to form wells which define the chamber 3 and the first, second and third channels 20, 22, 24. In a second step, the other plate is etched by HF wet etching to define first and second trenches, typically from 400 to 500 nm in depth, corresponding in shape to the first and second electrode members 26, 28. In a third step, each of the trenches is filled with a first layer of about 50 nm of chromium and a second layer of about 250 nm of gold to form the electrode members 26, 28. In a fourth step, three holes are drilled by ultrasonic abrasion into the other plate so as to provide openings defining the ports 21, 23, 25 to the first, second and third channels 20, 22, 24. In a fifth and final step, the two plates are bonded together by direct fusion bonding so as to form the chip 2. In this embodiment the one plate is of smaller dimension that the other plate such that the contact pads 34, 36 are exposed.

Figure 4:
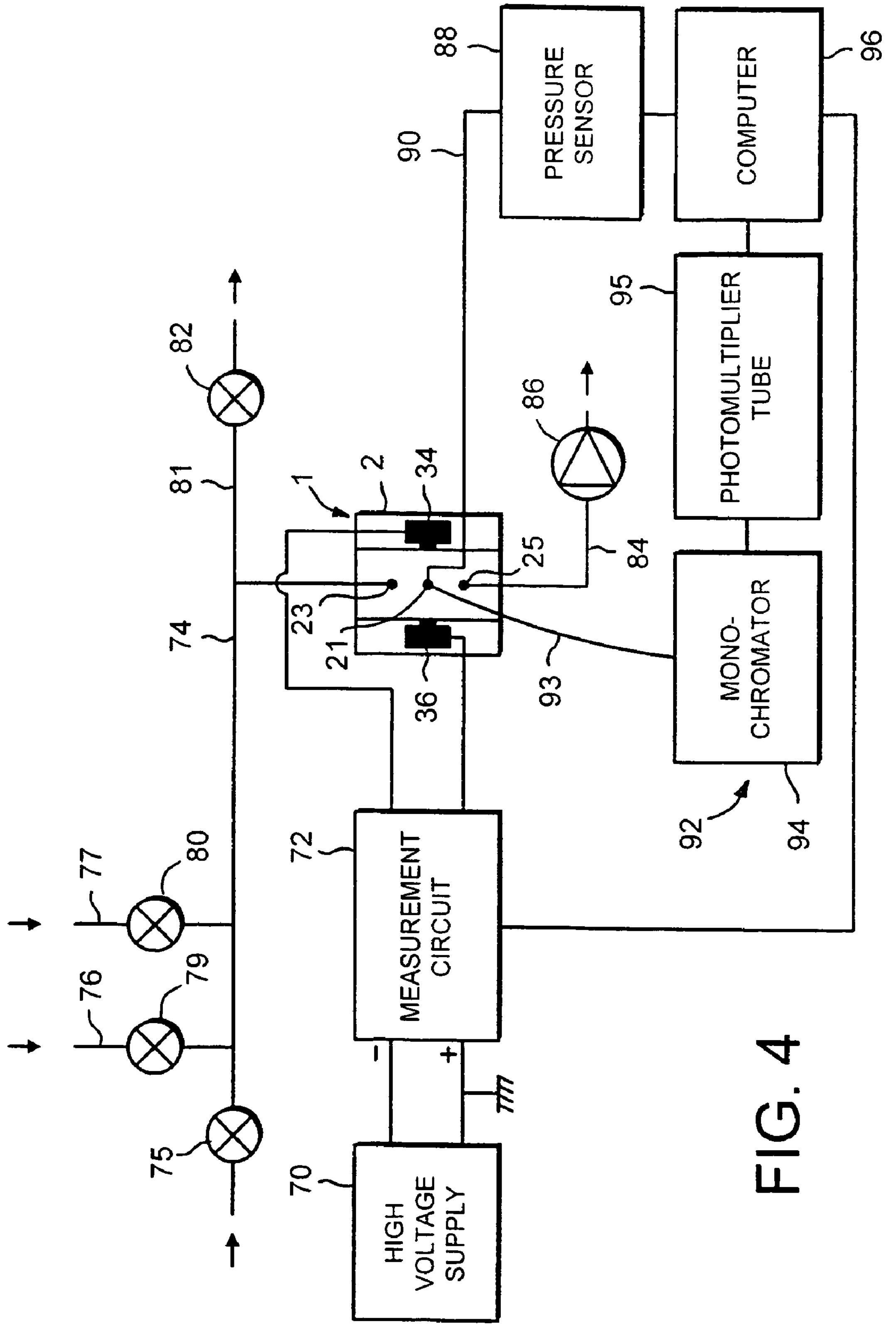

FIG. 4 illustrates a measurement system incorporating the above-described plasma generator 1.

Figure 5:
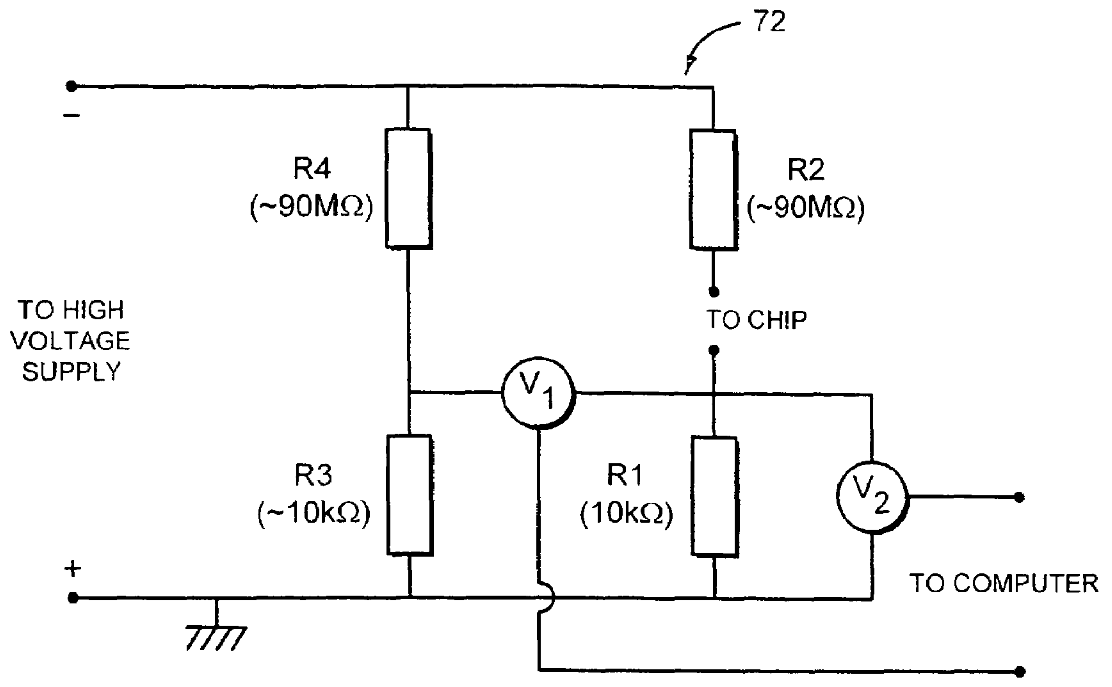

The measurement system comprises a d.c. high voltage power supply 70 connected through a measurement circuit 72 to the contact pads 34, 36 of the electrode members 26, 28. The circuitry of the measurement circuit 72 is illustrated in FIG. 5; the connection of a voltmeter directly across the electrodes 30, 32 being impossible because the stability of the discharge depends critically on the series resistor used and on the parasitic capacitance across the plasma-generation region 4 of the chamber 3. In the measurement circuit 72 the voltages $V_1$, $V_2$ are proportional to the discharge voltage and the discharge current respectively. The measurement circuit 72 is calibrated by changing the resistance of resistor R3, using respectively an open and a short circuit in place of the chip 2. In a preferred embodiment metal film resistors are used for the resistors R1, R2, R3 and R4 to reduce the temperature dependence of the measurement circuit 72.

The measurement system further comprises a delivery line 74 which includes a metering valve 75 and is connected to the port 23 of the second channel 22, in this embodiment by a Swagelok$^{RTM}$ connector to a fused silica capillary tube bonded to the chip 2, through which operating medium, in this embodiment helium, is in use introduced into the chamber 3. The delivery line 74 further includes first and second branch lines 76, 77, each including a metering valve 79, 80, through which analyte and reactant can selectively be introduced into the delivery line 74 as will be discussed in more detail hereinbelow. The delivery line 74 further includes a third branch line 81 which includes a metering valve 82 and is in communication with the atmosphere.

The measurement system further comprises an exhaust line 84 connected to the port 25 of the third channel 24, in this embodiment by a Swagelok$^{RTM}$ connector to a fused silica capillary tube bonded to the chip 2, and a vacuum pump 86 connected to the exhaust line 84 such as to maintain the plasma-generation region 4 of the chamber 3 at a sub-atmospheric pressure, typically from 6666.1 to 33330.5 Pa (50 to 250 mm Hg). In an alternative embodiment the pump 86 can be omitted and a sub-atmospheric pressure maintained in the plasma-generation region 4 by appropriately shaping and/or dimensioning the chamber 3 and the second and third channels 22, 24 and controlling the pressure of the operating medium delivered through the delivery line 74. Indeed, the construction of the chip 2 is such that, by making the volume of the plasma-generation region 4 sufficiently small, the chip 2 can be operated at or above atmospheric pressure, typically up to about $1.1*10^5$ Pa (1.1 bar).

The measurement system further comprises an optical sensor unit 92 for detecting the optical emission from the plasma developed in the plasma-generation region 4 of the chamber 3. The optical sensor unit 92 comprises an optical fibre bundle 93 coupled directly to the one plate of the chip 2 adjacent the plasma-generation region 4, which fibre bundle 93 receives the light transmitted through the one transparent plate, a monochromator 94 connected to the fibre bundle 93 and a photomultiplier tube 95 connected to the monochromator 94. In a preferred embodiment the one plate of the chip 2 can be shaped so as to form a focussing lens, typically a cylinder lens, for focussing the light emitted by the plasma.

The measurement system still further comprises a computer 96 connected to the measurement circuit 72, the pressure sensor 88 and the optical sensor unit 92 such as to allow for recordal of the plasma voltage, the plasma current, the pressure in the plasma-generation region 4 and the optical emission of the plasma.

In another modification, the plasma generator 1 can further comprise a plurality of light detectors 97, for example photodiodes, which are mounted to the one plate of the chip 2 adjacent the plasma-generation region 4 of the chamber 3. In a preferred embodiment each of the detectors 97 includes an optical filter 98, for example an interference filter, such as to be selective to a specific wavelength or range of wavelengths within the emission spectrum of the plasma. It will be understood that with this configuration the detectors 97 are connected directly to the computer 96 and the optical sensor unit 92 is omitted from the measurement system. By providing a plurality of detectors 97 which are each selective to a particular part of the emission spectrum, the sensitivity of the measurement system can be improved.

Figure 6:
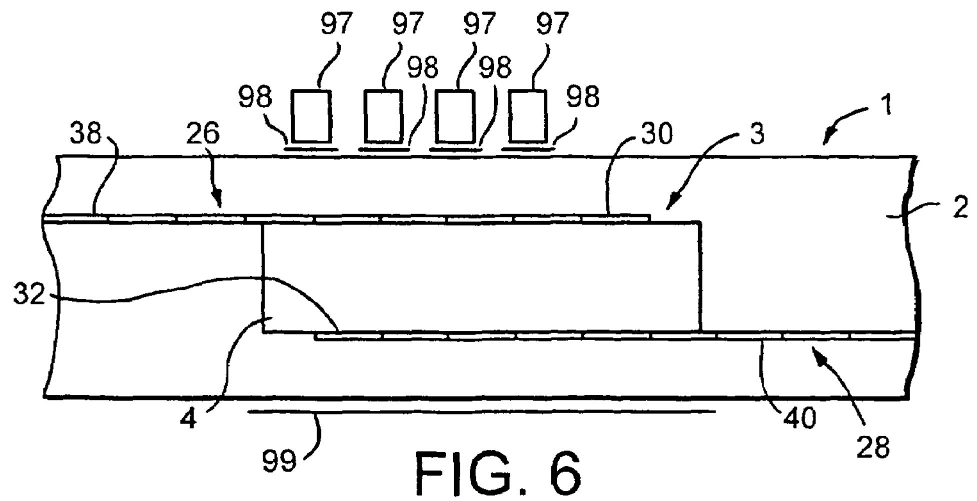

In a further modification, also as illustrated in FIG. 6, a reflective surface 99, typically a mirrored surface, can be disposed to the side of the chamber 3 opposite to which the emitted light is detected such as to reflect light emitted by the plasma to that side of the chamber 3.

In use, a d.c. high voltage, pulsed or continuous, is applied across the electrodes 30, 32 and operating medium in the form of a gas or vapour is fed through the delivery line 74 into the chamber 3. Typically, the measurement system is configured such that the inlet pressure at the inlet port 23 of the chip 2 is from 1 to $3*10^5$ Pa (1 to 3 bar) and the outlet pressure at the outlet port 24 of the chip 2 is up to $1*10^5$ Pa (1 bar). The third branch line 81 which communicates with atmosphere is preferably provided as a bleed line to ensure that the fluid flowing through the delivery line 74 is frequently replenished. Frequent replenishment of the fluid flowing through the delivery line 74 is ideally required in order to avoid contamination by leakage and wall desorption. If the third branch line 81 were omitted the fluid in the delivery line 74 could stagnate as the rate of fluid flow through the chip 2 is relatively low, leading to a much lower flow rate in the larger dimension delivery line 74.

In a first step, analyte in the form of a gas or vapour is delivered through the first branch line 76 into the delivery line 74 and subsequently into the chamber 3. The flow rate through the chamber 3 is optimized so as to maximize the analyte concentration in the chamber 3 and yet maintain a sufficiently short response time. Typically, the flow rate through the chamber 3 is from 10 to 500 nl/s, with a linear flow rate in the plasma-generation region 4 of about 1 mm/s. Where the delivery line 74 is connected to a separation system, the operating medium is a gas where the separation system utilizes a gaseous medium, such as in gas chromatography, and a vapour of a liquid where the separation system utilizes a liquid medium, such as in liquid chromatography or capillary electroseparation. In a preferred embodiment the operating medium is a noble gas such as helium. While analyte is delivered to the chamber 3, a plasma is generated in the plasma-generation region 4 which includes characteristics representative of the analyte and those characteristics are measured. In this system, both the electrical and optical properties of the plasma are measured, with the electrical properties being measured using the measurement circuit 72 and the optical properties being measured using the optical sensor unit 92.

In a further step, reactant in the form of a gas or vapour is delivered through the second branch line 77 into the delivery line 74 and subsequently into the chamber 3. Typical reactants include hydrogen, nitrogen and oxygen. This reactant is introduced to modify the plasma in a detectable manner, notably by modifying the emission spectrum to include molecular lines, and hence provide measurements which assist in determining the composition of the analyte.

With regard to the electrical properties, the discharge voltage in particular is sensitive to changes in the plasma arising from the introduction of analyte. With regard to the optical properties, atomic and/or molecular emissions can be measured, typically the atomic lines or rotation-vibration bands of molecules, for example CH, CN, NH, C2, OH, etc. . .

This embodiment will now be described with reference to the following non-limiting Examples.

EXAMPLE 1

Figure 7:
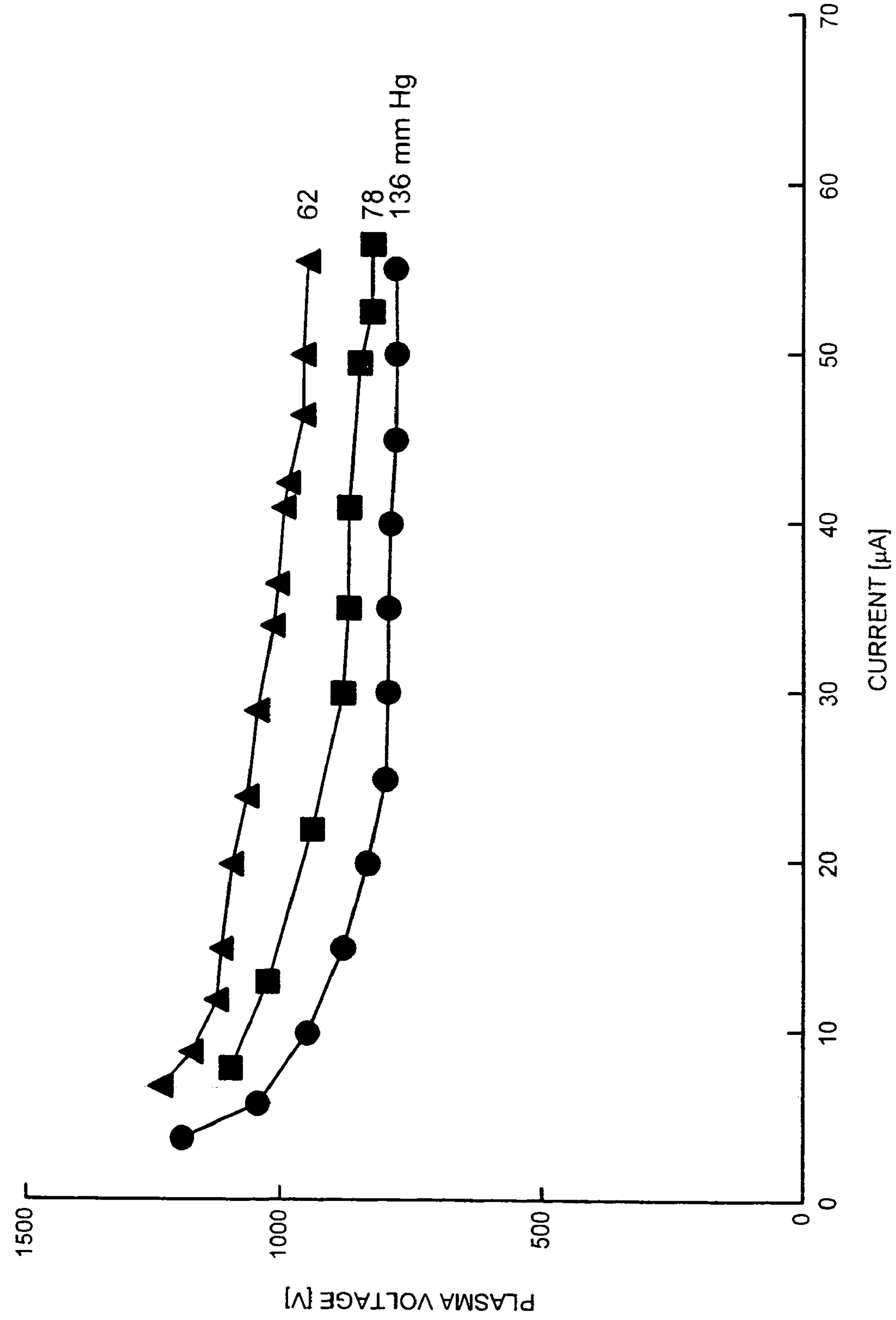
FIG. 7 illustrates the voltage/current diagrams of the plasma generator of FIG. 1 at various operating pressures.

In this Example the current/voltage diagrams for the above-described plasma generator 1, with the plasma-generation region 4 having dimensions of 450 μm in width, 200 μm in depth and 5000 μm in length (450 nl in volume), the electrode-housing regions 6, 8 having dimensions of 1 mm in width, 200 μm in depth and 1 mm in length, the second channel 22 having dimensions of 6 μm in depth, 98 μm in width and 0.5 m in length and the third channel 24 having dimensions of 6 μm in depth, 155 μm in width and 40 mm in length, were measured at operating pressures of 8265.964, 10399.116 and 18131.792 Pa (62, 78 and 136 mm Hg). These current/voltage diagrams are illustrated in FIG. 7. The decrease in the plasma voltage with increasing pressure can be explained by the reduction in the cathode fall thickness. At higher pressures, the cathode fall is thinner compared to the height of the cathode region such that the loss of charged particles and the voltage are reduced. The decrease in plasma voltage with increasing current is frequently observed in plasma generators and is considered to result from heating of the operating medium in the plasma-generation region 4.

EXAMPLE 2

Figure 8:
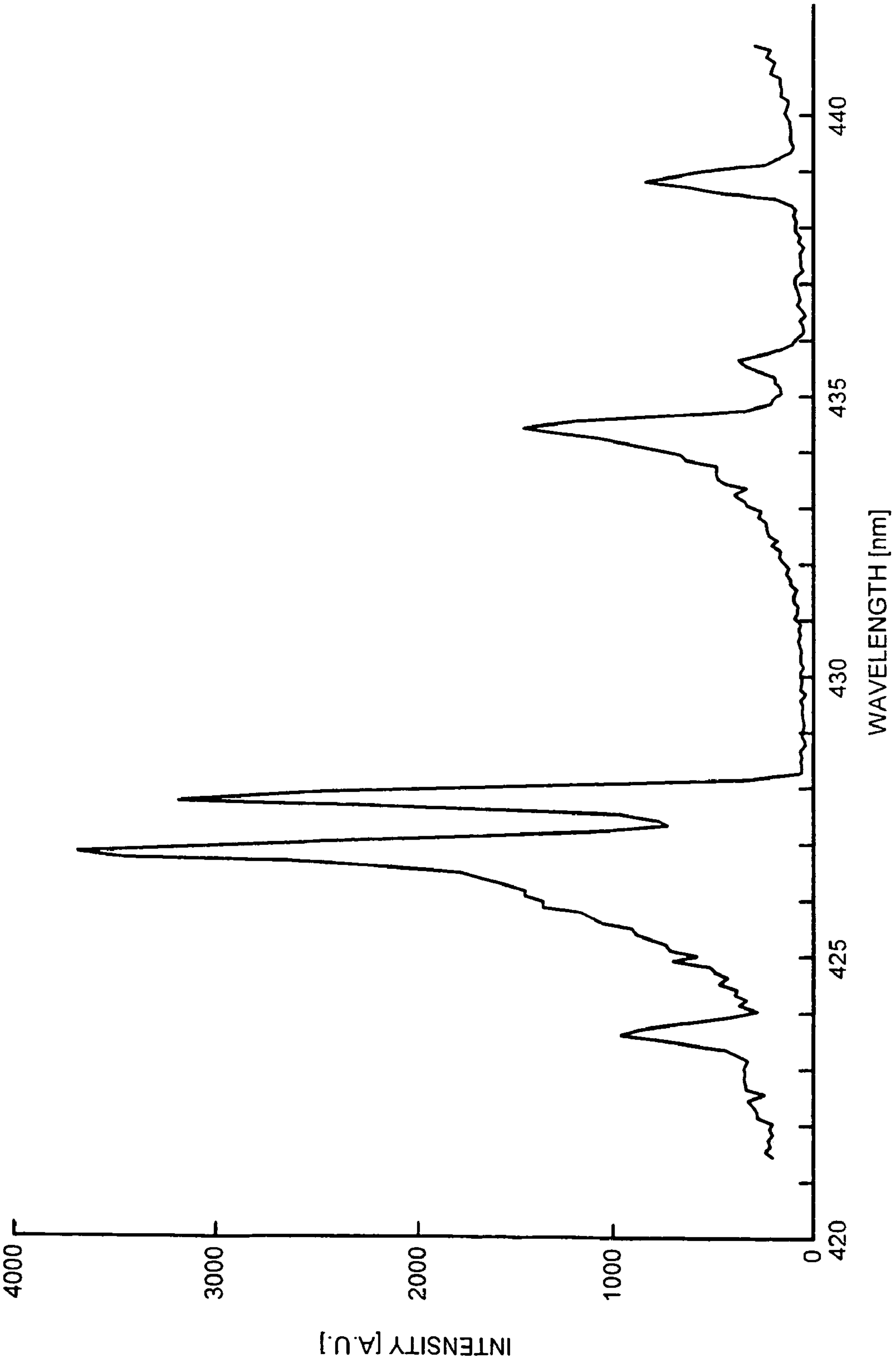
FIG. 8 illustrates a first emission spectrum obtained using the measurement system of FIG. 4.
Figure 9:
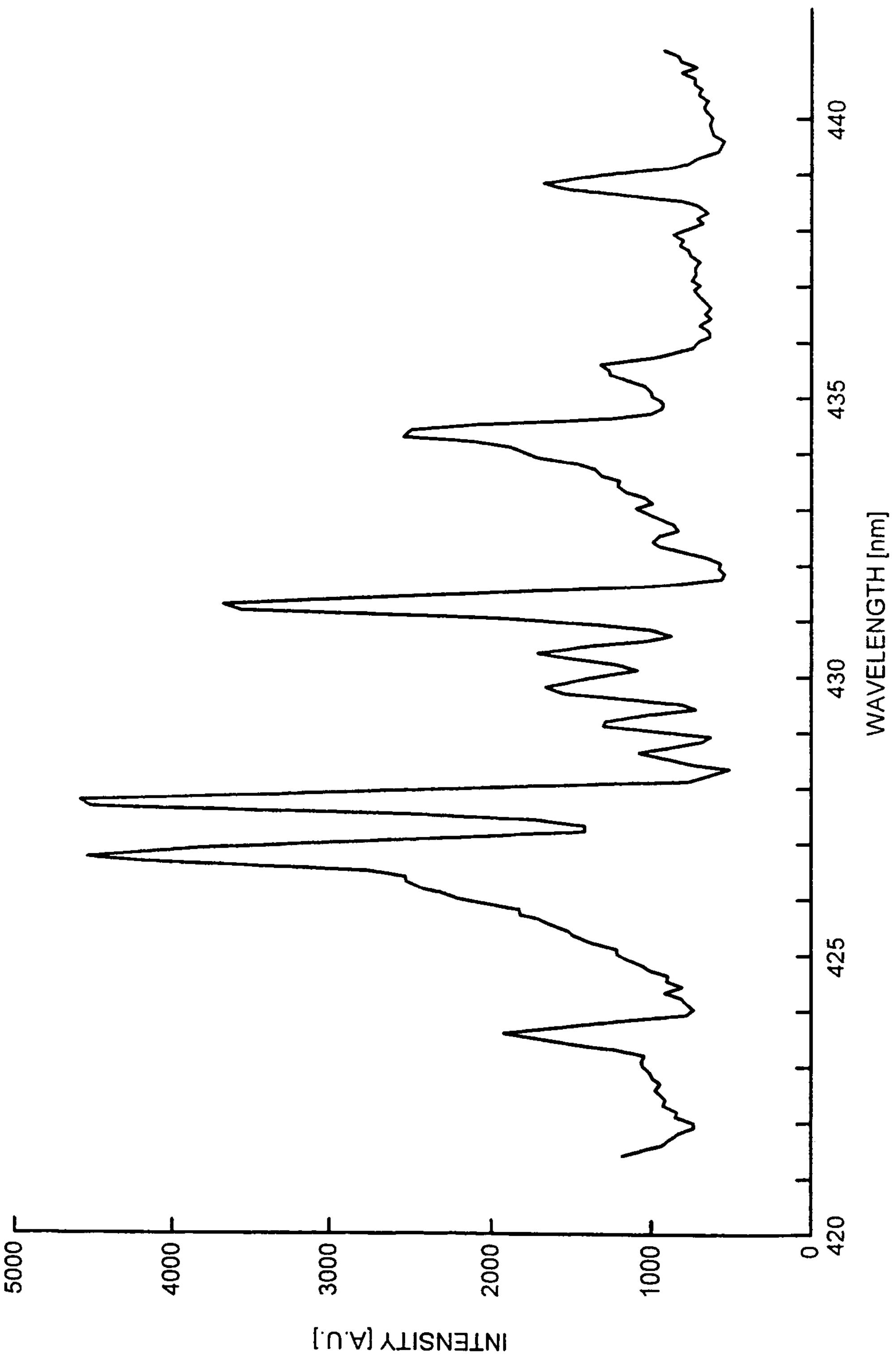
FIG. 9 illustrates a second emission spectrum obtained using the measurement system of FIG. 4.

In this Example the above-described plasma generator 1, with the plasma-generation region 4 having dimensions of 250 μm in width, 100 μm in depth and 2000 μm in length (50 nl in volume), the electrode-housing regions 6, 8 having dimensions of 1 mm in width, 100 μm in depth and 1 mm in length, the second channel 22 having dimensions of 6 μm in depth, 30 μm in width and 0.5 m in length and the third channel 24 having dimensions of 6 μm in depth, 46 μm in width and 40 mm in length, was operated at a pressure of 17331.86 Pa (130 mm Hg) and with a plasma current of 30 μA. Using helium as the operating medium and supplying air as analyte, the emission spectrum for wavelengths of between 420 and 440 nm was measured. This emission spectrum is illustrated in FIG. 8 and all of the intense peaks can be attributed to $N_2$ and $N_2^+$. Subsequently, 1% methane was supplied as further analyte and the resulting emission spectrum for wavelengths of between 420 and 440 nm measured. This modified spectrum is illustrated in FIG. 9 and the spectrum shows, in addition to the nitrogen lines, the CH A X diatomic emission band with the band head at 431.3 nm and the corresponding related fine structure extending to lower wavelengths.

EXAMPLE 3

Figure 10:
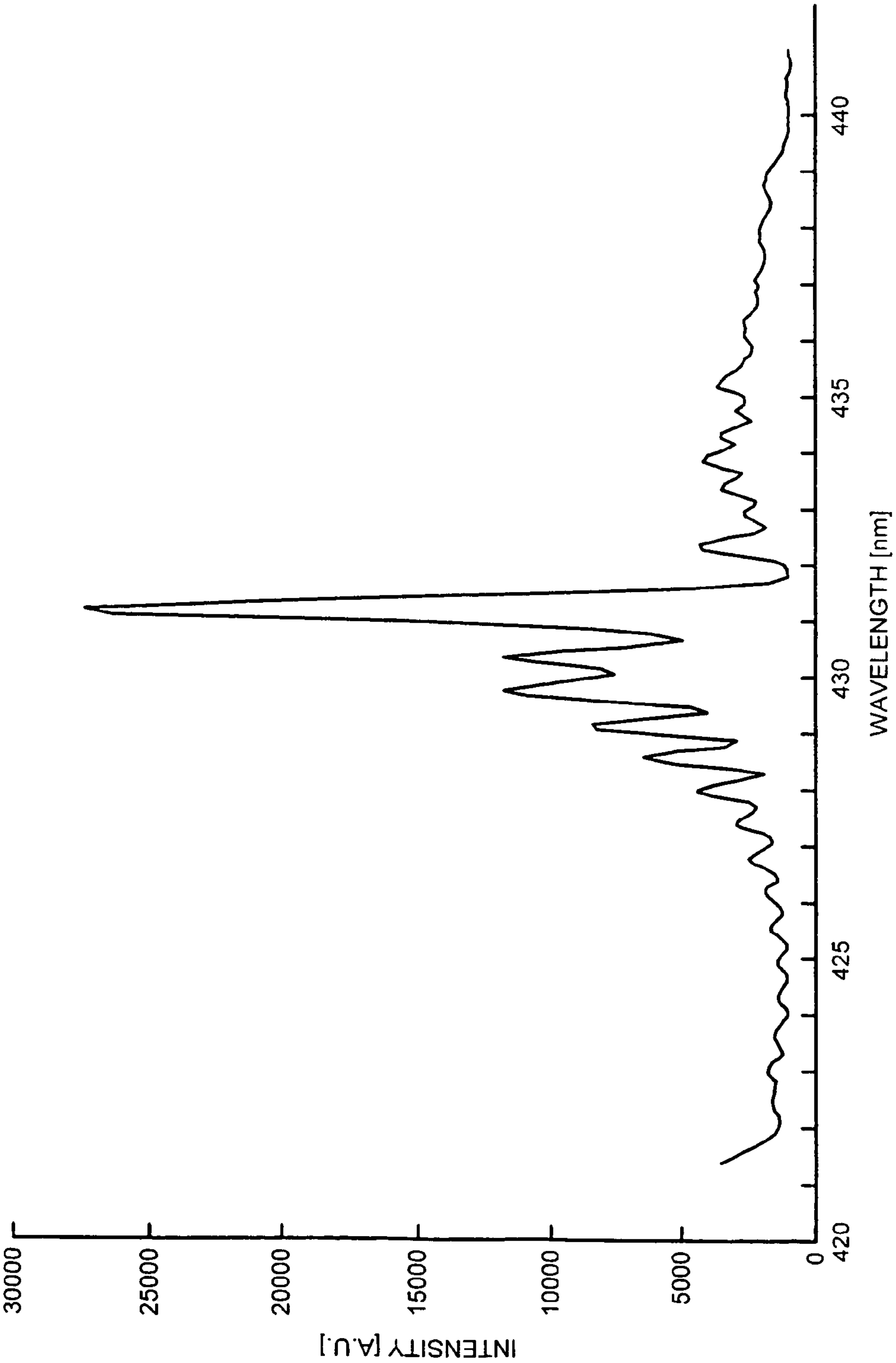
FIG. 10 illustrates a third emission spectrum obtained using the measurement system of FIG. 4.

In this Example the above-described plasma generator 1, with the plasma-generation region 4 having dimensions of 250 μm in width, 100 μm in depth and 2000 μm in length (50 nl in volume), the electrode-housing regions 6, 8 having dimensions of 1 mm in width, 100 μm in depth and 1 mm in length, the second channel 22 having dimensions of 6 μm in depth, 30 μm in width and 0.5 m in length and the third channel 24 having dimensions of 6 μm in depth, 46 μm in width and 40 mm in length, was operated at a pressure of 17331.86 Pa (130 mm Hg) and with a plasma current of 30 μA. Using helium as the operating medium and supplying 3% methane as analyte, the emission spectrum for wavelengths of between 420 and 440 nm was measured. This emission spectrum is illustrated in FIG. 10 and shows the CH A→X diatomic emission band with the band head at 431.3 nm and the corresponding related fine structure extending to lower wavelengths.

From the above Examples, assuming a linear response down to the limit of detection, which has been observed in large scale d.c. plasma generators, the detection limit of the above-described plasma generator 1 is at least $3*10^{-12}$ g/s, or, expressed alternatively, 600 ppm. This detection limit is of the same order as that achievable in large scale d.c. plasma generators.

FIG. 11 illustrates a microfabricated plasma generator 101 in accordance with a second embodiment of the present invention as fabricated in a substrate chip 102.

The chip 102 includes a chamber 103 which defines a plasma-generation region 104, in this embodiment comprising a first, elongate linear section 104a and second and third, short sections 104b, 104c which extend orthogonally from the respective ends of the first section 104a, in which a plasma is in use generated, and first and second electrode-housing regions 106, 108 at respective ones of the free ends of the second and third sections 104b, 104c.

The chamber 103 includes a first port 110 located substantially at a midpoint along the length of the first section 104a of the plasma-generation region 4, and second and third ports 116, 118 located at respective ones of the electrode-housing regions 106, 108.

The chip 102 further includes a first channel 120 which includes a port 121 and provides a fluid communication path with the first port 110 of the chamber 103, and a second channel 124 which includes a port 125 and provides a fluid communication path with the second and third ports 116, 118 of the chamber 103.

The chip 102 further includes first and second conductive electrode members 126, 128, with each of the electrode members 126, 128 comprising an electrode 130, 132 disposed in a respective one of the first and second electrode-housing regions 106, 108, a contact pad 134, 136 for providing a means of contact to an external power supply, and a lead 138, 140 connecting the electrode 130, 132 and the contact pad 134, 136. In this embodiment the plasma generator 101 is configured to be driven by applying a d.c. high voltage, pulsed or continuous, across the electrodes 130, 132. With this configuration, where the electrodes 130, 132 are offset from the linear section 104*a* of the plasma-generation region 104, the optical emission from the linear section 104*a* and the electrodes 130, 132 can be measured separately.

The chip 102 further includes an optical guide 150 which is coupled to one end of the first section 104*a* of the plasma-generation region 104 and configured such as to be axially aligned with the same, whereby an optical coupling is provided for measuring the optical emission from any generated plasma.

The chip 102 is fabricated from two planar substrate plates in the same manner as for the above-described first embodiment.

Further, operation of this plasma generator 101 is the same as for that of the above-described first embodiment.

FIG. 12 illustrates the chip layout of a chip 102 of a microfabricated plasma generator 101 in accordance with a third embodiment of the present invention. This plasma generator 101 comprises a plurality of chambers 103, each defining a plasma-generation region 104 of the same kind as in the above-described second embodiment. In this embodiment the chambers 103 are arranged in parallel, with the second channels 124 from each of the chambers 103 being connected to a single port 125 by a manifold channel 151. Operation of each of the plasma-generation regions 104 is the same as in the above-described second embodiment, with this configuration allowing for a plurality of samples, of the same or different kind, to be analysed simultaneously.

FIG. 13 illustrates the chip layout of a chip 102 of a plasma generator 101 in accordance with a fourth embodiment of the present invention. This chip 102 is quite similar to that of the above-described second embodiment, and thus in order to avoid unnecessary duplication of description only the differences will be described in detail, with like parts being designated by like reference signs. This chip 102 differs from that of the second-described embodiment only in that the chip 102 further comprises a plurality of supplementary electrode members 152, 154, 156, 158, each of which comprises a measurement electrode 160, 162, 164, 166 extending into the plasma-generation region 104 at locations spaced along the length thereof, a contact pad 168, 170, 172, 174 for providing a means of contact to external circuitry, and a lead 176, 178, 180, 182 connecting the measurement electrode 160, 162, 164, 166 and the contact pad 168, 170, 172, 174. This plasma generator 101 is operated in the same manner as that of the above-described second embodiment, but further allows the voltage difference to be measured between a plurality of positions in the plasma generated in the elongate plasma-generation region 104. For certain plasmas, measurement of the voltage difference, other than between the anode and the cathode, can provide for an improved signal-to-noise ratio and hence sensitivity.

FIG. 14 illustrates the chip layout of a chip 102 of a plasma generator 101 in accordance with a fifth embodiment of the present invention. This chip 102 is quite similar to that of the above-described second embodiment, and thus in order to avoid unnecessary duplication of description only the differences will be described in detail, with like parts being designated by like reference signs. This chip 102 differs from that of the second-described embodiment in that the chamber 103 includes fourth and fifth ports 184, 186, in this embodiment located adjacent to and on opposed sides of the first port 110, and in further including a third channel 188 which includes a port 189 and provides a fluid communication path with the second port 184 of the chamber 103 and a fourth channel 190 which includes a port 191 and provides a fluid communication path with the fifth port 186 of the chamber 103.

In one mode of use, operating medium is fed through the third and fourth channels 188, 190 and analyte is fed separately through the first channel 120 directly into the plasma-generation region 104. Reactant can be delivered together with the operating medium or the analyte. Otherwise, operation of this plasma generator 101 is the same as for the above-described second embodiment. With this confirmation, the plasma generator 101 can be used with a liquid sample, which sample is vaporized on entering the chamber 103.

In another mode of use, operating medium, analyte and reactant are fed to the chamber 103 separately through respective ones of the first, third and fourth channels 120, 188, 190. Otherwise, operation of this plasma generator 101 is the same as for the above-described second embodiment. As in the first mode of use described hereinabove, with this configuration, the plasma generator 101 can be used with a liquid sample.

In a further mode of use, this plasma generator 101 can be driven by a flame. In this mode of use, a first fuel component in the form of a gas or vapour, such as hydrogen, is fed through the first channel 120 and a second fuel component in the form of a gas or vapour, such as oxygen, together with analyte is fed through the third and fourth channels 188, 190. Reactant can be delivered together with the operating medium or the analyte. Otherwise, operation of this plasma generator 101 is the same as for the above-described second embodiment, with the fuel components being ignited to provide a flame plasma on applying a voltage between the electrodes 130, 132.

FIG. 15 illustrates the chip layout of a chip 102 of a plasma generator 101 in accordance with a sixth embodiment of the present invention. This chip 102 is quite similar to that of the above-described second embodiment, and thus in order to avoid unnecessary duplication of description only the differences will be described in detail, with like parts being designated by like reference signs. This chip 102 differs from that of the second-described embodiment firstly in that the second channel 124 is not connected to the second and third ports 116, 118 of the chamber 103, but rather the chamber 103 includes fourth and fifth ports 193, 194 located at positions spaced from and on opposed sides of the first port 110 to which the second channel 124 is connected. This chip 102 further differs from that of the second-described embodiment in further including a third channel 195 which includes a port 196 and provides a fluid communication path with the second port 116 of the chamber 103, and a fourth channel 197 which includes a port 198 and provides a fluid communication path with the third port 118 of the chamber 103, through which channels 195, 197 operating medium is delivered to the chamber 103.

In use, one or both of analyte and reactant are delivered through the first channel 120 and operating medium and the other of analyte and reactant, where not delivered through the first channel 120, are delivered through the fourth and fifth channels 195, 197. Otherwise, operation of this plasma generator 101 is the same as for the above-described second embodiment. With this configuration, analyte and/or reactant which are incompatible with the material of the electrodes 130, 132 can be used, since the analyte and/or reactant never contact the electrodes 130, 132 as the flow path of the analyte and/or reactant enters the chamber 103 through the first port 110 and exits the chamber 103 through the fourth and fifth ports 193, 194.

FIG. 16 illustrates a microfabricated plasma generator 201 in accordance with a seventh embodiment of the present invention as fabricated in a substrate chip 202.

The chip 202 includes a chamber 203 which defines a plasma-generation region 204, in this embodiment an elongate linear region, in which a plasma is in use generated, and an electrode-housing region 206 at one end of the plasma-generation region 204.

The chamber 203 includes a first port 210 located at the other end of the plasma-generation region 204, and a second port 216 located at the electrode-housing region 206, in this embodiment the anode region.

The chip 202 further includes a first channel 220 which includes a port 221 and provides a fluid communication path with the first port 210 of the chamber 203, and a second channel 224 which includes a port 225 and provides a fluid communication path with the second port 216 of the chamber 203.

The chip 202 further includes first and second conductive electrode members 226, 228. The first electrode member 226 comprises an electrode 230, in this embodiment the anode, disposed in the electrode-housing region 206, a contact pad 234 for providing a means of contact to an external power supply, and a lead 238 connecting the anode 230 and the contact pad 234. The second electrode member 228 comprises a contact pad 239 for providing a means of contact to an external power supply and a lead 240 which extends into the one end of the plasma-generation region 204. In this embodiment the plasma generator 201 is configured to be driven by applying a d.c. high voltage, pulsed or continuous, across the contact pads 234, 239.

The chip 202 is fabricated from two planar substrate plates in the same manner as that of the above-described first embodiment.

In use, a d.c. high voltage, pulsed or continuous, is applied across the contact pads 234, 239 and a liquid 242 as operating medium containing analyte is fed at a predetermined flow rate through the first channel 220 into the chamber 203. In a preferred embodiment the first channel 220 is connected to a separation system which utilizes a liquid, such as in liquid chromatography or capillary electroseparation. With this configuration, the liquid 242 in contact with the lead 240 of the second electrode member 228 defines the cathode and a plasma is generated between the liquid cathode 242 and the anode 230. With continued operation, the surface 243 of the liquid 242 exposed to the plasma continuously evaporates as a result of the heat generated by the plasma. A stable liquid surface 243 is achieved by the heat-sinking effect of the lead 240 of the second electrode member 228, and the position of the liquid surface 243 is maintained by matching the flow rate of the liquid 242 into the chamber 203 to the rate of evaporation of the liquid 242. Evaporated liquid is exhausted to waste through the second channel 224. While liquid 242 containing analyte is delivered to the chamber 203, a plasma is generated in the plasma-generation region 204 of the chamber 203 which includes characteristics representative of the analyte and those characteristics are measured electrically and optically.

FIG. 17 illustrates a microfabricated plasma generator 301 in accordance with an eighth embodiment of the present invention as fabricated in a substrate chip 302.

The chip 302 includes a chamber 303 which defines a plasma-generation region 304, in this embodiment an elongate linear region, in which a plasma is in use generated. The chamber 303 includes a constriction 305 at substantially a midpoint of the plasma-generation region 304 and first and second ports 310, 316 located at respective ends of the plasma-generation region 304.

The chip 302 further includes a first channel 320 which includes a port 321 and provides a fluid communication path with the first port 310 of the chamber 303, and a second channel 324 which includes a port 325 and provides a fluid communication path with the second port 316 of the chamber 303.

The chip 302 further includes first and second conductive electrode members 326, 328. The first electrode member 326 comprises a contact pad 334 for providing a means of contact to an external power supply and a lead 338 which extends into the one end of the plasma-generation region 304 adjacent the second port 316. The second electrode member 328 comprises a contact pad 339 for providing a means of contact to an external power supply and a lead 340 which extends into the other end of the plasma-generation region 304. In this embodiment the plasma generator 301 is configured to be driven by applying a d.c. high voltage, pulsed or continuous, across the contact pads 334, 339.

The chip 302 is fabricated from two planar substrate plates in the same manner as that of the above-described first embodiment.

In use, a d.c. high voltage, pulsed or continuous, is applied across the contact pads 334, 339 and a liquid 342 as operating medium containing analyte is fed at a predetermined flow rate through the first channel 320 into the chamber 303. In a preferred embodiment the first channel 320 is connected to a separation system which utilizes a liquid, such as in liquid chromatography or capillary electroseparation. With this configuration, the liquid 342 in contact with the lead 340 of the second electrode member 328 defines the cathode, and the vapour condenses as a liquid 342' on the lead 338 of the first electrode member 326 and is so defining the anode, and a plasma is generated between the liquid cathode 342 and the liquid anode 342'; the position of the plasma being centred about the constriction 305 in the plasma-generation region 304. With continued operation, the surface 343 of the introduced liquid 342 exposed to the plasma continuously evaporates as a result of the heat generated by the plasma and condenses as the liquid 342' forming the anode. A stable liquid surface 343 is achieved by the heat-sinking effect of the lead 340 of the second electrode member 328, and the position of the liquid surface 343 is maintained by matching the flow rate of the liquid 342 into the chamber 303 to the rate of evaporation of the liquid 342. Evaporated liquid 342' is exhausted to waste through the second channel 324. While liquid 342 containing analyte is delivered to the chamber 303, a plasma is generated in the plasma-generation region 304 which includes characteristics representative of the analyte and those characteristics are measured electrically and optically.

FIG. 18 illustrates a microfabricated plasma generator 401 in accordance with a ninth embodiment of the present invention as fabricated in a substrate chip 402.

The chip 402 includes a chamber 403 which defines a plasma-generation region 404, in this embodiment of square section in plan view, in which a plasma is in use generated. The chamber 403 includes first, second, third and fourth ports 410, 412 414, 416 disposed at opposite sides of the plasma-generation region 404.

The chip 402 further includes a first channel 420 which includes a port 421 and provides a fluid communication path with the first port 410 of the chamber 403, and a second channel 424 which includes a port 425 and provides a fluid communication path with the second port 412 of the chamber 403.

The chip 402 further includes a third channel 427, in this embodiment a T-shaped channel, which includes a first, elongate linear section 428 which includes inlet and outlet ports 429, 431 at the respective ends thereof and a second, junction section 432 which extends orthogonally from substantially the midpoint of the first section 428 and is in fluid communication with the third port 414 of the chamber 403.

The chip 402 further includes a fourth channel 437, in this embodiment a T-shaped channel, which includes a first, elongate linear section 438 which includes inlet and outlet ports 439, 441 at the respective ends thereof and a second, junction section 442 which extends orthogonally from substantially the midpoint of the first section 438 and is in fluid communication with the fourth port 416 of the chamber 403.

The chip 402 further includes first and second conductive contact elements 450, 452 which extend into respective ones of the third and fourth channels 427, 437 at the intersections between the first and second channel sections 428, 432, 438, 442 thereof. In this embodiment the plasma generator 401 is configured to be driven by applying a d.c. high voltage, pulsed or continuous, across the contact elements 450, 452.

The chip 402 is fabricated from two planar substrate plates in the same manner as that of the above-described first embodiment.

In use, first and second liquids 454, 456 are maintained in the third and fourth channels 427, 437, which liquids 454, 456 by capillary action extend to the third and fourth ports 414, 416 of the chamber 403 and act as electrodes, and a d.c. high voltage, pulsed or continuous, is applied across the contact elements 450, 452 to generate a plasma in the plasma-generation region 404. In a preferred embodiment the liquids 454, 456 comprise water which can be solved with ions for controlling the conductivity and/or relative reactivity with the plasma. Operating medium containing analyte in the form of a gas or vapour is fed into the chamber 403 through the first channel 420 and exhausted to waste through the second channel 424. In a preferred embodiment the first channel 420 is connected to a separation system which utilizes a gaseous medium, such as in gas chromatography. While operating medium containing analyte is delivered to the chamber 403, a plasma is generated in the plasma-generation region 404 which includes characteristics representative of the analyte and those characteristics are measured electrically and optically.

Finally, it will be understood that the present invention has been described in its preferred embodiments and can be modified in many different ways within the scope of the invention as defined by the appended claims.

For example, the plasma generators could be configured so as to be driven by applying an a.c. voltage across the electrodes. As will be understood, however, the use of an a.c. voltage to drive the plasma generators would require modification of the chips such that the electrodes are covered by a dielectric or insulating layer, or, alternatively, located outside the chamber where the chip is formed of an insulating material, such that discharge is by dielectric barrier discharge or high frequency discharge.

Further, in the case of pulsed d.c. discharges or a.c. discharges, the measurement system can be configured to detect the optical emission during a specific period relative to the driving voltage. For some plasmas, by selectively detecting the optical emission, the sensitivity can be increased and/or the noise signal reduced.

Still further, the measurement system can be configured to measure the absorption or fluorescence properties of the emission spectrum. In one embodiment the photo-galvanic effect could be utilised by measuring the absorption of monochromatic light, as for example supplied by a diode laser, by analyte in the plasma, with the absorbed light altering the energy balance and thus the discharge voltage. Where the light is modulated, the modulation of the discharge voltage can be detected even when very small.

The invention claimed is:

1. A microfabricated plasma generator, comprising:

a substrate chip;

a chamber defined by the substrate chip, the chamber including an inlet port through which analyte is in use delivered, an outlet port and a plasma-generation region in which a plasma is in use generated; and first and second electrodes across which a voltage is in use applied to generate a plasma therebetween in the plasma-generation region, wherein the plasma is a particular ionized gas containing charged particles of both polarities.

2. A plasma generator according to claim 1, wherein the plasma generator is a gas discharge plasma generator.

3. A plasma generator according to claim 1, wherein the plasma generator is a flame plasma generator.

4. A plasma generator according to claim 1, wherein the inlet port is located between the first and second electrodes.

5. A plasma generator according to claim 1, wherein the outlet port is located at one of the first and second electrodes.

6. A plasma generator according to claim 5, wherein the chamber includes first and second outlet ports, each located at a respective one of the first and second electrodes.

7. A plasma generator according to claim 1, wherein the outlet port is located between the first and second electrodes.

8. A plasma generator according to claim 7, wherein the outlet port is located between the inlet port and one of the first and second electrodes.

9. A plasma generator according to claim 8, wherein the chamber includes first and second outlet ports, each located between the inlet port and a respective one of the first and second electrodes.

10. A plasma generator according to claim 1, wherein the chamber includes a further inlet port through which reactant is in use delivered.

11. A plasma generator according to claim 10, wherein the further inlet port is located between the first and second electrodes.

12. A plasma generator according to claim 10, wherein an outlet port is located between the further inlet port and one of the first and second electrodes.

13. A plasma generator according to claim 1, wherein the chamber includes a second further inlet port through which operating medium is in use delivered.

14. A plasma generator according to claim 13, wherein the chamber includes second and third further inlet ports through which operating medium is in use delivered.

15. A plasma generator according to claim 14, wherein the second and third further inlet ports are located at respective ones of the first and second electrodes.

16. A plasma generator according to claim 1, wherein the plasma-generation region comprises on elongate region.

17. A plasma generator according to claim 16, wherein the plasma-generation region comprises an elongate linear region.

18. A plasma generator according to claim 17, wherein the first and second electrodes are disposed on the longitudinal axis of the plasma-generation region.

19. A plasma generator according to claim 17, wherein the first and second electrodes are offset from the longitudinal axis of the plasma-generation region.

20. A plasma generator according to claim 1, wherein the first and second electrodes are disposed so as to oppose one another.

21. A plasma generator according to claim 20, wherein the first and second electrodes comprise substantially planar elements disposed substantially parallel to one another.

22. A plasma generator according to claim 1, wherein the first and second electrodes comprise solid electrodes.

23. A plasma generator according to claim 22, wherein at least one of the first and second electrodes is a hollow electrode.

24. A plasma generator according to claim 1, wherein at least one of the first and second electrodes comprises a liquid electrode.

25. A plasma generator according to claim 24, wherein the first and second electrodes comprise liquid electrodes.

26. A plasma generator according to claim 1, further comprising at least one focusing lens in optical communication with the plasma-generation region.

27. A plasma generator according to claim 26, wherein the at least one lens is defined by the substrate chip.

28. A plasma generator according to claim 1, further comprising a reflective surface adjacent the plasma-generation region for reflecting light emitted in use by the plasma towards a detection location.

29. A plasma generator according to claim 28, wherein the detection location is within the plasma-generation region.

30. A plasma generator according to claim 1, further comprising at least one optical detector in optical communication with the plasma-generation region.

31. A plasma generator according to claim 30, wherein the at least one optical detector comprises a photodiode.

32. A plasma generator according to claim 30, comprising a plurality of optical detectors in optical communication with the plasma-generation region.

33. A plasma generator according to claim 32, wherein each optical detector is sensitive to light of a predetermined wavelength or range of wavelengths.

34. A plasma generator according to claim 1, further comprising an optical guide in optical communication with the plasma-generation region for providing a means of optical coupling to an optical detector.

35. A plasma generator according to claim 1, further comprising at least one supplementary electrode disposed such as to be in electrical connection with a location in the plasma-generation region spaced from the first and second electrodes.

36. A plasma generator according to claim 35, comprising a plurality of supplementary electrodes disposed such as to be in electrical connection with spaced locations in the plasma-generation region.

37. A plasma generator according to claim 1, wherein the plasma-generation region is enclosed by the substrate chip.

38. A plasma generator according to claim 1, wherein the volume of the plasma-generation region is not more than 1 mil.

39. A plasma generator according to claim 38, wherein the volume of the plasma-generation region is not more than 100 μl.

40. A plasma generator according to claim 39, wherein the volume of the plasma-generation region is not more than 10 μl.

41. A plasma generator according to claim 40, wherein the volume of the plasma-generation region is not more than 450 nl.

42. A plasma generator according to claim 41, wherein the volume of the plasma-generation region is not more than 50 nl.

43. A plasma generator according to claim 1, wherein the chamber is shaped and/or dimensioned such as to operate at sub-atmospheric pressures.

44. A plasma generator according to claim 1, wherein the chamber is shaped and/or dimensioned such as to operate at or above sub-atmospheric pressure outlet port is located between the first and second electrodes.

45. A plasma generator according to claim 1, comprising a plurality of chambers and a plurality of first and second electrodes for generating a plasma in each of the chambers, with the outlet ports of each of the chambers being coupled together such that the chambers are arranged in parallel.

46. A plasma generator according to claim 1, wherein the substrate chip comprises a plurality of planar substrates as a multi-layered structure.

47. A plasma generator according to claim 46, wherein one of the planar substrates includes a cavity defining the chamber.

48. A plasma generator according to claim 47, wherein a plurality of the planar substrates each include a cavity defining the chamber.

49. A measurement system incorporating the plasma generator according to claim 1.

50. A method of generating a plasma, comprising the steps of:

providing a plasma generator comprising a substrate chip defining a chamber including a plasma-generation region, and first and second electrodes across which a voltage is applied to generate a plasma in the plasma-generation region;

delivering analyte and operating medium to the chamber; and applying a voltage across the first and second electrodes to generate a plasma therebetween in the plasma-generation region, wherein the plasma is a particular ionized gas containing charged particles of both polarities.

51. A method of generating a plasma according to claim 50, wherein the first and second electrodes comprise solid electrodes.

52. A method of generating a plasma according to claim 50, wherein at least one of the first and second electrodes comprises a liquid electrode.

53. A method of generating a plasma according to claim 52, wherein the first and second electrodes comprise liquid electrodes.

54. A method of generating a plasma according to claim 50, wherein the analyte is a gas or vapour.

55. A method of generating a plasma according to claim 50, wherein the analyte is delivered as a liquid which evaporates on introduction into the chamber.

56. A method of generating a plasma according to claim 50, wherein the operating medium is a gas or vapour.

57. A method of generating a plasma according to claim 50, wherein the operating medium is delivered as a liquid which evaporates on introduction into the chamber.

58. A method of generating a plasma according to claim 50, wherein the analyte and the operating medium are delivered together as a liquid which evaporates on introduction into the chamber.

59. A method of generating a plasma according to claim 52, wherein the operating medium is delivered as a liquid which provides the cathode and evaporates into the plasma-generation region.

60. A method of generating a plasma according to claim 52, wherein the analyte and the operating medium are delivered together as a liquid which provides the cathode and evaporates into the plasma-generation region.

61. A method of generating a plasma according to claim 59, wherein the anode is provided by the liquid when condensed.

62. A method of generating a plasma according to claim 50, wherein the plasma generator is a gas discharge plasma generator.

63. A method of generating a plasma according to claim 50, wherein the plasma generator is a flame plasma generator and the operating medium is a fuel which is ignited on the application of a voltage across the first and second electrodes.

64. A method of generating a plasma according to claim 63, wherein the operating medium comprises first and second fuel components.

* * * * *